US006996470B2

(12) United States Patent
Kamps

(10) Patent No.: US 6,996,470 B2
(45) Date of Patent: Feb. 7, 2006

(54) SYSTEMS AND METHODS FOR GEOPHYSICAL IMAGING USING AMORPHOUS COMPUTATIONAL PROCESSING

(75) Inventor: Bill Kamps, Houston, TX (US)

(73) Assignee: MOAC LLC, Denver, CO (US)

( * ) Notice: Subject to any disclaimer, the term of this patent is extended or adjusted under 35 U.S.C. 154(b) by 18 days.

(21) Appl. No.: 10/687,371

(22) Filed: Oct. 15, 2003

(65) Prior Publication Data

US 2005/0027455 A1    Feb. 3, 2005

Related U.S. Application Data

(60) Provisional application No. 60/491,942, filed on Aug. 1, 2003.

(51) Int. Cl.
*G06F 19/00* (2006.01)

(52) U.S. Cl. .............................................. 702/17; 703/5
(58) Field of Classification Search ................. 702/17, 702/14, 1, 12, 2; 324/158.1; 716/12; 712/11; 367/43; 327/551; 703/5, 10
See application file for complete search history.

(56) References Cited

U.S. PATENT DOCUMENTS

| 4,286,319 A | 8/1981 | Membrino et al. ......... 709/208 |
| 4,351,025 A | 9/1982 | Hall, Jr. ....................... 703/21 |
| 4,414,624 A | 11/1983 | Summer, Jr. et al. ......... 712/21 |
| 4,816,993 A | 3/1989 | Takahashi et al. ............ 212/28 |
| 4,843,540 A * | 6/1989 | Stolfo .......................... 712/11 |
| 5,025,369 A | 6/1991 | Schwartz .................... 718/102 |
| 5,198,979 A | 3/1993 | Moorhead et al. ............ 702/17 |
| 5,307,496 A | 4/1994 | Ichinose et al. ............ 718/104 |
| 5,361,373 A | 11/1994 | Gilson .......................... 712/1 |
| 5,404,296 A | 4/1995 | Moorhead ..................... 702/14 |
| 5,428,783 A | 6/1995 | Lake ........................... 718/106 |
| 5,430,734 A | 7/1995 | Gilson ......................... 714/725 |
| 5,537,319 A | 7/1996 | Schoen ......................... 702/14 |
| 5,550,787 A | 8/1996 | Rialan et al. ................. 367/77 |
| 5,600,845 A | 2/1997 | Gilson ......................... 712/39 |
| 5,657,223 A | 8/1997 | Juszczak et al. ............ 705/400 |
| 5,734,829 A | 3/1998 | Robinson .................... 702/205 |
| 5,944,779 A | 8/1999 | Blum .......................... 702/201 |
| 5,991,695 A | 11/1999 | Wang et al. .................. 702/14 |

(Continued)

OTHER PUBLICATIONS

Announcement entitled: "PGS Debuts Seismic Processing System for UNIX/LINUX", (Cube Manager 2.50 Product Announcement), *Communications of the ACM*, Oct. 2000, vol. 43, No. 10, p. 55.

(Continued)

*Primary Examiner*—Andrew H. Hirshfeld
*Assistant Examiner*—Victor J. Taylor
(74) *Attorney, Agent, or Firm*—Marsh Fischmann & Breyfogle LLP

(57) ABSTRACT

Various systems and methods of the present invention provide amorphous computing systems and methods for use thereof. In some cases, the amorphous computing systems include one or more amorphous hardware elements that are programmed under control of a computer processor such as, for example, an AMD™ or INTEL™ based personal computer. Portions of an algorithm can then be computed by the individual amorphous hardware elements that can be, as one example, an FPGA or some subset of hardware gates available on an FPGA. Methods can include a variety of computations including Wave Equations and Kirchhoff algorithms. Thus, in particular cases, the amorphous computing systems and methods for using such are applied to seismic imaging problems, as well as other problems.

26 Claims, 9 Drawing Sheets

U.S. PATENT DOCUMENTS

| | | | |
|---|---|---|---|
| 5,995,904 A | 11/1999 | Willen et al. | 702/14 |
| 6,049,759 A | 4/2000 | Etgen | 702/14 |
| 6,057,679 A * | 5/2000 | Slizynski et al. | 324/158.1 |
| 6,061,730 A | 5/2000 | Billings | 709/231 |
| 6,112,225 A | 8/2000 | Kraft et al. | 709/202 |
| 6,115,764 A | 9/2000 | Chisholm et al. | 710/100 |
| 6,134,599 A | 10/2000 | Chiu et al. | 709/250 |
| 6,304,916 B1 | 10/2001 | Iwatsuki et al. | 702/250 |
| 6,330,583 B1 | 12/2001 | Reiffin | 718/105 |
| 6,446,007 B1 | 9/2002 | Finn et al. | 702/14 |
| 6,496,969 B2 * | 12/2002 | Roy et al. | 716/12 |
| 6,535,940 B1 | 3/2003 | Liu et al. | 710/305 |
| 2003/0023576 A1 | 1/2003 | Gilson | 707/1 |
| 2003/0028590 A1 | 2/2003 | Gonzalez et al. | 709/203 |
| 2003/0115096 A1 | 6/2003 | Gilson | 705/14 |
| 2004/0225443 A1 * | 11/2004 | Kamps | 702/14 |
| 2005/0027455 A1 * | 2/2005 | Kamps | 702/17 |

OTHER PUBLICATIONS

Article entitled "NASA Langley Installs Next Generation Star Bridge Hypercomputer", Wasatch Digital IQ, Mar. 26, 2003, 1 page.

Ashida, Yuzuru Abstract of "Data Processing of Reflection Seismic Data by Use of Neural Network", *Journal of Applied Geophysics*, Oct. 1996, vol. 35, No. 2-3, pp. 89-98.

Barraez, D. et al., Abstract of "Modular Neural Networks for Seismic Tomography", *Proceedings 16th International Conference on Pattern Recognition, IEEE Comput. Soc.*, Part vol. 3, 2003, pp. 407-410.

Bohlen, T., Abstract of "Parallel 3D Viscoelastic Finite Difference Seismic Modeling.", *Computers and Geosciences*, Oct. 2002, vol. 28, No. 8, pp. 887-899., Publisher: Elsevier, UK.

Ewing, R.E. et al, Abstract of "Distributed Computation of Wave Propagation Models Using PVM.", *IEEE Parallel & Distributed Technology*, vol. 2, no.1, Spring 1994, pp. 26-31, USA.

Fithian, W. et al. "Iterative Matrix Equation Solver for a Reconfigurable FPGA-Based Hypercomputer®" Star Bridge Systems, Inc., Sep. 5, 2002, 14 pages.

Gazdag. Jeno and Wang, Hsuan-Heng; Abstract of "Concurrent Computing by Sequential Staging of Tasks", *IBM Systems Journal*, Dec. 1989, vol. 28, No. 4, p. 646 (15).

Gilson, Kent et al. "New Methodology For FPGA Based Designs Offers Significant Benefits over HDL Based Methods", Jan. 2002, 5 pages.

Hoogerbrugge, P. et al., Abstract of "Experiences With Networked Parallel Computing", *Concurrency Practice & Experience*, vol. 7, No. 1, Feb. 1995 pp. 1-16. UK.

Hunter, P "Oiling the Wheels", *Computer Weekly*, Jun. 7, 2001, p. 31 (Full Text: 2001 Reed Elsevier Business Publishing, Ltd., UK,) (6 pages).

Jian, Lu et al. "A Hierarchical Framework for Parallel Seismic Applications", *Association for Computing Machinery, Inc., Communications of the ACM*, Oct. 2000, vol. 43, (6 pages).

Kofakis, P. & Louis, J., "Distributed Parallel Implementation of Seismic Algorithms.", *Mathematical Methods in Geophysical Imaging III, Proceedings of Spie- The International Society for Optical Engineering*, vol. 2571, 1995, pp. 229-238, USA.

Kolbasuk McGee, Marianne, "Mobil Leaves Cray for Parallel Universe.", *InformationWeek*, Oct. 11, 1993, No. 446, p. 62.

Lyons, Daniel, "Super-Cheap Supercomputing?" Forbes. com website, Mar. 25, 2003, 4 pages.

Niccanna, C. & Bean, CJ, Abstract of "Larger Grids and Shorter Wall-clock Times on a Parallel Virtual Machine (PVM)—an Example Using a Finite Difference Wave Simulation Algorithm", *GeoComputation 96—1st International Conference on GeoComputation*, 1996, Univ. Leeds, Part vol. 2, pp. 661-662.

Niccanna, C. & Bean, CJ, Abstract of "The Use of a Parallel Virtual Machine (PVM) for Finite-Difference Wave Simulations.", *Computers & Geosciences*, vol. 23, No. 7, Aug. 1997, pp. 771-783, Publisher: Elsevier, UK.

Sen, V., Sen, M.K., & Stoffa, P.L., "PVM Based 3-D Kirchhoff Depth Migration Using Dynamically Computed Travel-Times: An Application in Seismic Data Processing.", *Parallel Computing*, Mar. 1999, vol. 25, No. 3, pp. 231-248, Publisher: Elsevier, Netherlands.

Shimshoni, Y. et al., "Classification of Seismic Signals by Integrating Ensembles of Neural Networks", *IEEE Transactions on Signal Processing*, vol. 46, No. 5, May 1998, pp. 1194-1201. (Abstract) (1 page).

Singleterry, R. et al. "Field-Programmable Gate Array Computer in Structural Analysis: An Initial Exploration", American Institute of Aeronautics and Astronautics, Paper No. AIAA-2002-1761, 11 pages.

Stammler, K. Abstract of "Seismic Handler-programmable Multichannel Data Handler for Interactive and Automatic Processing of Seismological Analyses", *Computers & Geosciences*, vol. 19, No. 2, Feb. 1993, pp. 135-140. UK.

Thomson, Kimball, "From the Basement to the Stars: SBS Unleashes VIVA", Digital iQ, Apr. 2001, pp. 58-63.

* cited by examiner

SYSTEMS AND METHODS FOR GEOPHYSICAL IMAGING USING AMORPHOUS COMPUTATIONAL PROCESSING

CROSS-REFERENCES TO RELATED APPLICATIONS

The present invention claims priority to U.S. PROVISIONAL PATENT APPLICATION No. 60/491,942 entitled "SYSTEMS AND METHODS FOR GEOPHYSICAL IMAGING USING AMORPHOUS COMPUTATIONAL PROCESSING", and filed Aug. 1, 2003. The entirety of the aforementioned provisional patent application is incorporated herein by reference for all purposes.

BACKGROUND OF THE INVENTION

The present invention relates to computational processing. More particularly, the present invention provides amorphous computing systems and methods for using such to perform complex computational processing. Such complex processing can reduce a dataset to a user desirable form. As just one example, the dataset can be a group of seismic data that is reduced to form a three-dimensional image of a geologic formation. Other datasets can also be reduced.

The seismic processing industry is involved in processing large amounts of seismic data using very complex algorithms. This is especially true for imaging algorithms that use the majority of the compute power in this industry. Such processing has historically involved the use of expensive supercomputers, or high end workstations. As an example, the amounts of data involved and the complexity of the algorithms often requires weeks of processing time to create an image of a geologic structure. To reduce processing costs, the seismic processing industry has been experimenting with the use of low cost computers as its main processing engines. Using such an approach, as many as 10,000 or more low cost computers can be grouped to perform a single computation. However, because of the nature of the low cost computers, the devices comprising the low cost computers, and/or the means for grouping the low cost computers, it has been difficult to achieve more than approximately twenty percent of the computational capacity included in the low cost computers. Further, managing computational tasks operating on so many low cost computers presents a significant management responsibility.

Thus, there exists a need in the art to provide advanced systems and methods for computational processing. As will be appreciated from the following disclosure, the systems and methods according to the present invention address these, and a number of other problems related to processing.

BRIEF SUMMARY OF THE INVENTION

The present invention provides systems and methods for performing complex computational analysis using amorphous hardware elements. Such amorphous hardware elements can be programmed under control of a general purpose computer processor such as, for example, an AMD™ or INTEL™ based personal computer. Based on the disclosure provided herein, one of ordinary skill in the art will appreciate that other computer processors can be used including computer workstations, super-computers, computer servers, imbedded CPUs and microcontrollers, and/or combinations thereof.

In particular cases, an algorithm for computation is apportioned such that one part of the algorithm is implemented via one amorphous hardware element, and another portion of the algorithm can be implemented via another of the amorphous hardware elements. In particular cases, the amorphous hardware elements include a number of hardware gates that can be implemented within, for example, a Field Programmable Gate Array (FPGA). Such an approach can provide a highly parallel computational function where a thousand pipelines or more are implemented in respective amorphous hardware elements. Each of these pipelines can operate independently of the other pipelines to produce a discrete portion of a final computational analysis. In some cases, all of these amorphous hardware elements are implemented on a single FPGA, while in other cases various of the amorphous hardware elements may be implemented across two or more FPGAs.

In particular cases, the computational analysis can include seismic imaging that includes processing a number of seismic input traces into a seismic image. Portions of the seismic input traces can be distributed to each of the amorphous hardware elements, and a three dimensional seismic image computed from results derived from the amorphous hardware elements. Other examples of datasets that can be processed in accordance with the present invention include, but are not limited to geophysical data, astronomical data, electromagnetic data, and the like.

As one of ordinary skill in the art will appreciate upon reading the disclosure provided herein, a number of advantages can be achieved through using amorphous computing systems and methods in accordance with the present invention. As just one of many examples, amorphous computing systems in accordance with the present invention can be used to dramatically reduce the cost associated with computation. Based on purchase price, without taking into account other factors such as facility costs which each can also be quite significant, an amorphous computing system implemented in accordance with embodiments of the present invention can be completed for approximately ten percent or less of the cost of a prior art system based on INTEL™ or AMD™ dual Pentium processor computers assembled into a nodular configuration. In particular embodiments, the cost can be approximately one percent of that of prior art systems.

As previously mentioned, significant savings can also be achieved in facility costs, including physical space costs, non-recurring air conditioning expense, and recurring electrical expenses. For example, it is not uncommon for seismic processing facilities to encompass ten thousand or more square feet just to house computer clusters to handle computational processing. Furthermore, each computer within the computer cluster generates considerable heat necessitating the use of multiple air conditioning units to cool the room where the computers are located.

An amorphous computing system in accordance with some embodiments of the present invention can be housed in a relatively small area encompassed by, for example, a 3U cabinet. Such an amorphous computing system can replace the computational functionality of as many as five thousand or more dual processor personal computers, and can be operated on less than ten Amperes of power. Thus, systems and methods in accordance with the present invention can drastically reduce the cost of complex computation.

In addition to the cost savings, the systems and methods in accordance with the present invention can significantly reduce the amount of computation time required to migrate a given dataset (e.g., a number of input traces) to a desired result. For example, in the seismic imaging industry, computations can take a month or more to complete. In fact, in some cases, several months of computational time can be required. This is in part due to the complexity that arises where hundreds of personal computers are used in unison to solve a problem. These problems are dramatically reduced where amorphous computing systems of the present invention are utilized. In particular, amorphous computing systems in accordance with the present invention can reduce computation time from months to days or less. By cutting the turnaround time from months to a few days, amorphous computing systems in accordance with the present invention may allow a company to run multiple iterations of a job in order to identify and assure the best result. Such an approach is typically impractical when prior art systems are used. In the prior art, an iterative approach was often only practical when operating on a minimal portion of a dataset to be reduced. Using amorphous computing systems in accordance with the present invention, an iterative approach can be applied to entire datasets that could not be treated iteratively using prior art systems.

Further, because of the computational efficiency of amorphous computing systems in accordance with the present invention, more accurate algorithms can be developed and utilized on a commercial basis. Thus, using the seismic imaging industry as an example, algorithms that are currently in use like the Kirchhoff time and depth algorithms can be improved, by taking advantage of the additional computational capability. Further, amorphous computing systems in accordance with the present invention provide an ability to fully utilize the finite difference wave equation that is too expensive for practical use on existing clustered computer systems.

Some embodiments of the present invention provide methods for processing data traces of varying lengths within one or more amorphous hardware elements. Such methods include providing at least one amorphous hardware element, and a computer processor communicably coupled to the amorphous hardware element(s) and to a computer readable medium. In some cases, the amorphous hardware element is a group of hardware gates included on an FPGA. Further, in some cases, the computer processor is a reduced instruction set computer.

In the methods, a data trace is accessed from the computer readable medium, a length of the data trace is determined, and a function is accessed from the computer readable medium that is operable to accept a trace length approximately equal to the determined length of the accessed data trace. In some cases, the accessed function is operable to accept a trace length incrementally larger than the determined length of the accessed data trace. In such a case, the excess length of the function can be padded with null data such that the length of the accessed data trace upon padding is equal to the trace length that the function is operable to receive.

In the aforementioned methods, the amorphous hardware element(s) is/are then programmed to implement the accessed function. In particular cases, the data trace is one of a plurality of data traces from a survey, and the plurality of data traces in the survey are of the same length. The computer readable medium can include multiple functions to select from, where each of the multiple functions are operable to accept data traces of differing trace lengths. In some cases, the method further includes selecting between two or more functions based at least in part on the determined length of the accessed data trace. In one particular case, one of the functions is operable to accept a trace length greater than the determined trace length, and another is operable to accept a trace length less than the determined trace length. In such a case, the function operable to accept the excess trace length can be chosen, and the excess trace length padded with null data.

In some cases, the methods further include assigning identifying names to the various functions maintained on the computer readable medium, and compiling the various functions to create executable functions accessible via the assigned identifying names. In particular cases, the functions are seismic imaging functions, and programming the amorphous hardware element(s) to implement the seismic imaging functions comprises defining a plurality of hardware gates within an FPGA or some other programmable service. Again, such an amorphous hardware element can be an FPGA, or a subset of hardware gates included within an FPGA. Further, in some cases, defining the plurality of hardware gates within the amorphous hardware element is operable to define one or more processing pipelines. In fact, in some instances, one thousand or more parallel processing pipelines can be defined. Each of the processing pipelines can work to update respective seismic image points independent from others of the plurality of processing pipelines. This provides for a high degree of parallelism, and a corresponding increase in processing throughput.

In specific cases, the methods are tailored to implement a Kirchhoff migration and include providing a set of coefficients for a high frequency filter corresponding to a threshold noise frequency and a set of coefficients for a sinc filter. In such cases, the processing pipeline(s) implement portions of a Kirchhoff migration. In one particular case, the processing pipeline consists essentially of six functions. The first function interpolates a velocity function to calculate a velocity at an image point; the second function utilizes the velocity to calculate a time of the data trace that contributes to the image point; the third function utilizes the time of the data trace to calculate a real sample number of the data trace, where the real sample number of the data trace includes a fractional offset from a whole sample number of the data trace; the fourth function filters a plurality of whole sample numbers of the data trace that straddle the real sample number of the data trace using the set of coefficients for a high frequency filter; the fifth function uses the set of coefficients for a sinc filter to interpolate the filtered plurality of whole number samples to the real sample number; and the sixth function sums the output of the fifth function into an output trace at the image point.

In other specific cases, the methods are tailored to implementing a plurality of portions of a wave equation as processing pipelines. In such specific cases, the processing pipeline consists essentially of: an update function that creates a set of simultaneous equations that will distribute energy from the data trace to a set of output image points located on an x,y,z coordinate grid; a tri-diagonal solver function that solves the set of simultaneous functions; and a thin lense adjustment function that compensates for a lateral velocity gradient.

Other embodiments of the present invention provide amorphous computing systems. In some cases, the amorphous computing systems include two or more amorphous hardware elements, and a computer processor communicably coupled to the amorphous hardware elements. The computer processor is associated with a computer readable medium that includes elements useful to implement one or more of the previously described methods. In one particular case, the computer readable medium includes: a dataset; instructions executable by the computer processor to determine a trace length, and to select a pipeline function suitable to the trace length; and instructions executable by the computer processor to access the selected pipeline function. In some cases, the computer readable medium further includes instructions executable by the computer processor to: program one of the amorphous hardware elements using the pipeline function to define a first processing pipeline, and to program other(s) of the amorphous hardware element(s) using the pipeline function to define other respective processing pipeline(s). Instructions are also included that are executable by the computer processor to: access at least a portion of the dataset; distribute a first section of the dataset to the first processing pipeline; distribute a second section of the dataset to the second processing pipeline; receive a first result from the first processing pipeline; and receive a second result from the second processing pipeline. In some cases, one of the processing pipelines is operable to create one seismic imaging output (e.g., image point or output trace), and the other processing pipeline(s) are operable to create other seismic imaging output(s). Such pipelines can be capable of independent operation.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 7 illustrates segmenting of data points illustrated in FIG. 3, and useful in relation to method of FIG. 6.

DETAILED DESCRIPTION OF THE INVENTION

The present invention relates to computational processing. More particularly, the present invention provides amorphous computing systems and methods for using such to perform complex computational processing. Such complex processing can reduce a dataset to a user desirable form. As just one example, the dataset can be a group of seismic data that is reduced to form a three-dimensional image of a geologic formation. Other datasets can also be reduced including, but not limited to other geophysical data, astronomical data, electromagnetic data, and the like.

Figure 1:
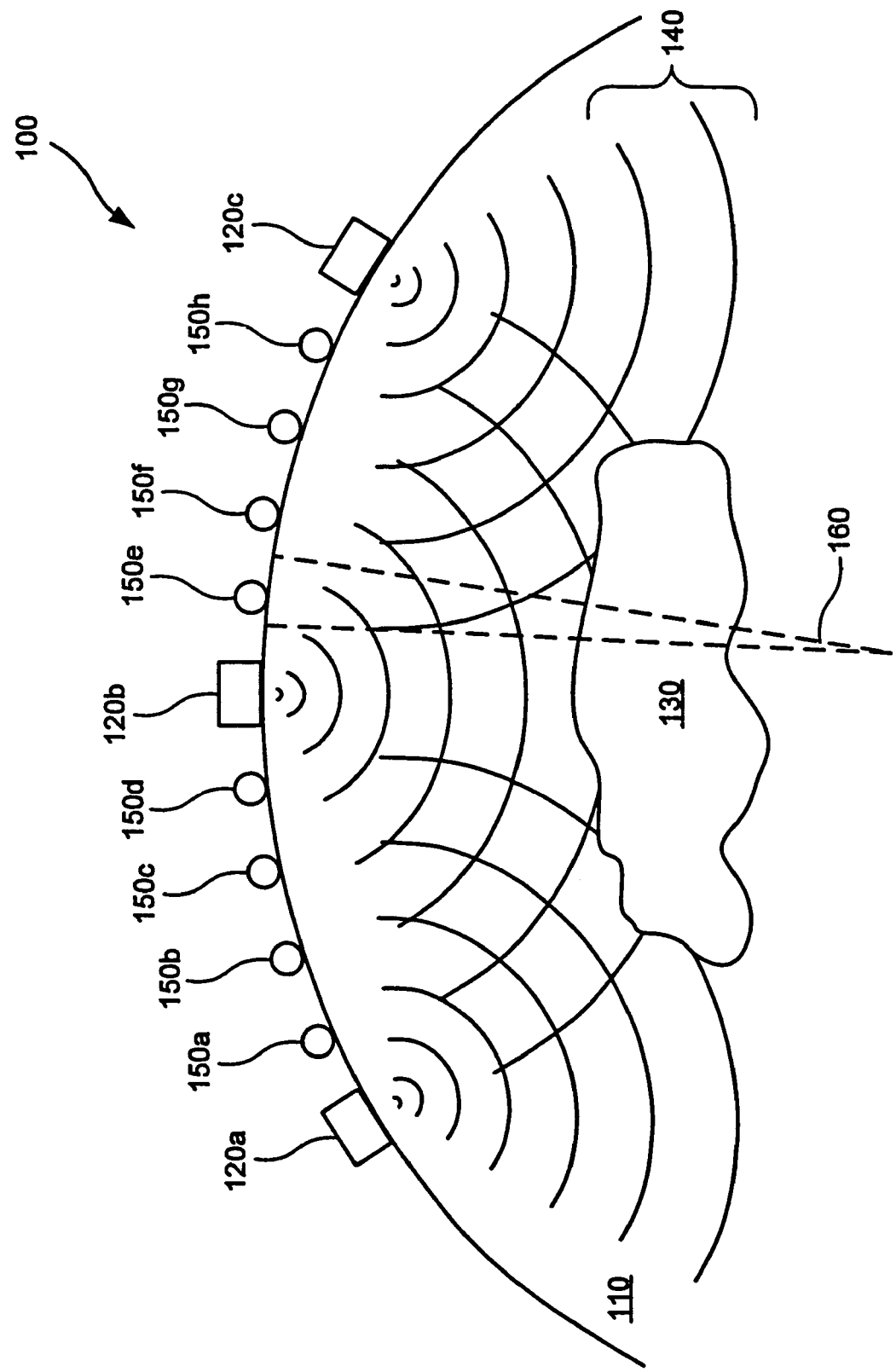
FIG. 1 is a simplified cross-sectional view of the Earth illustrating the placement of seismic sensors and a geologic structure to be measured.

While the invention can be applied to a number of computational scenarios, for illustration purposes it is described in relation to seismic imaging of geologic structures. Referring to FIG. 1, a simplified cross-sectional view 100 is provided of the Earth 110 illustrating the placement of seismic source locations 120 and a geologic structure 130 to be imaged. Seismic source locations 120 can include any source/sensor capable of producing measurement energy 140, and/or sensing such measurement energy 140 as it is reflected by structures internal to the Earth 110. One of ordinary skill in the art will recognize and understand a variety of such sensors. Also depicted are a number of receiver locations 150. Receiver locations 150 are locations on the surface of the Earth 110, or imaged regions 160 that extend from the surface to a point below the surface. In operation, energy 140, such as sound waves, from one or more of source locations 120 is transmitted into the Earth 110, and reflections of those waves are detected by various of source locations 120. This geographically spaced sensor data is then processed or interpolated to determine an image corresponding to receiver locations 150 and imaged regions 160. This processing or interpolating is referred to herein as seismic image processing. Further, the data received and/or measured at source locations 120 is referred to herein as seismic trace data, seismic data, and input trace data. The data generated from the input trace data for the various receiver locations 150 is referred to herein as output trace data, or output image data, or image points.

Figure 2:
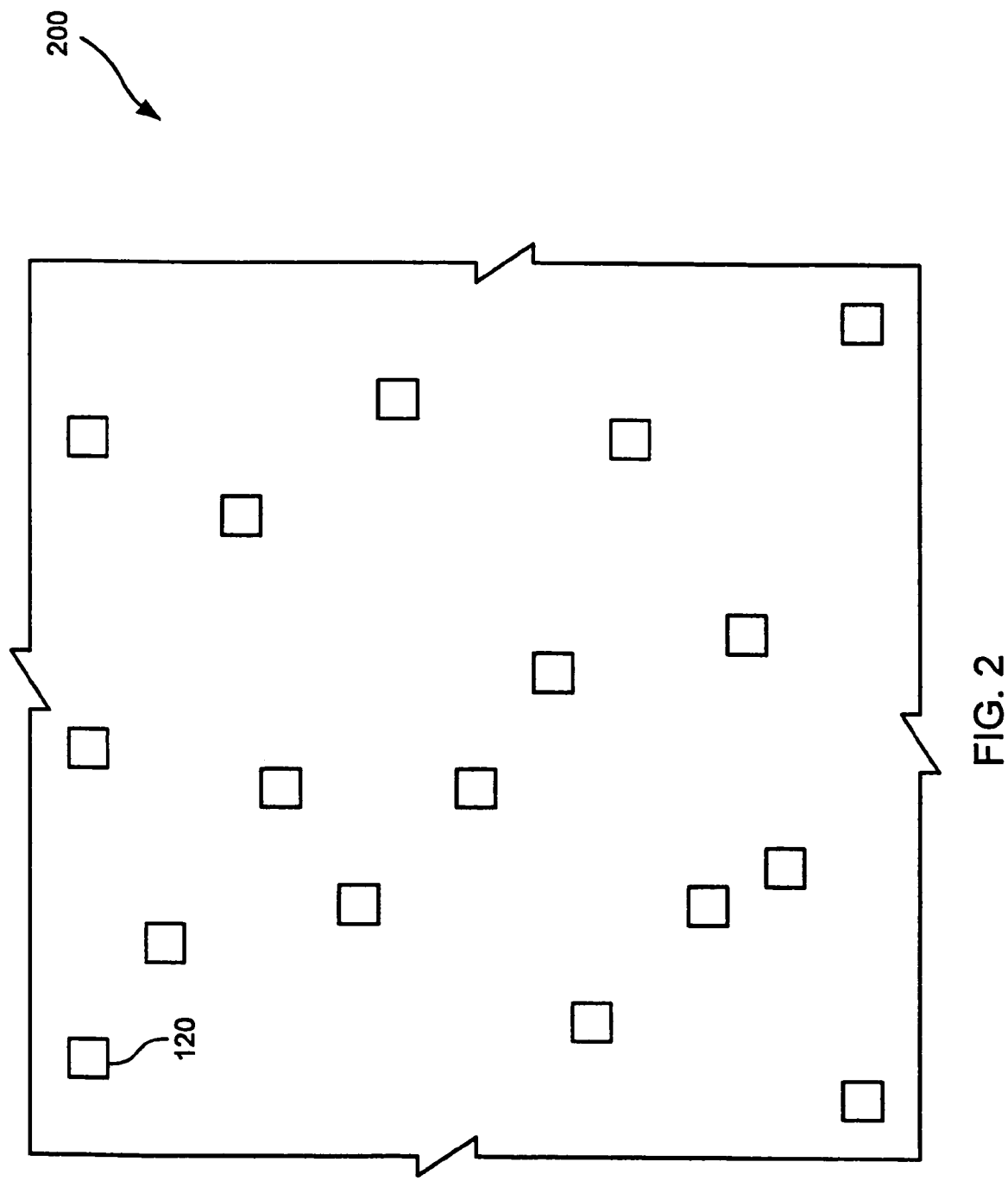
FIG. 2 is a two-dimensional top view of the placement of the seismic sensors of FIG. 1.

Referring to FIG. 2, a two-dimensional top view 200 depicting the relative physical location of seismic source locations 120 (illustrated as squares) across the surface of the Earth 110. Such source locations 120 can be placed at various locations across the Earth's surface. In some cases, source locations 120 are located within a few feet of another source/sensor, while in other cases, source locations 120 can be located miles or hundreds of miles from another source/sensor. For the purpose of the present description and invention, any number of source locations 120 can be used, and located at any location. The placement and use of source locations 120 is beyond the scope of the present disclosure. However, one of ordinary skill in the art will recognize how and where to place source locations 120.

Figure 3:
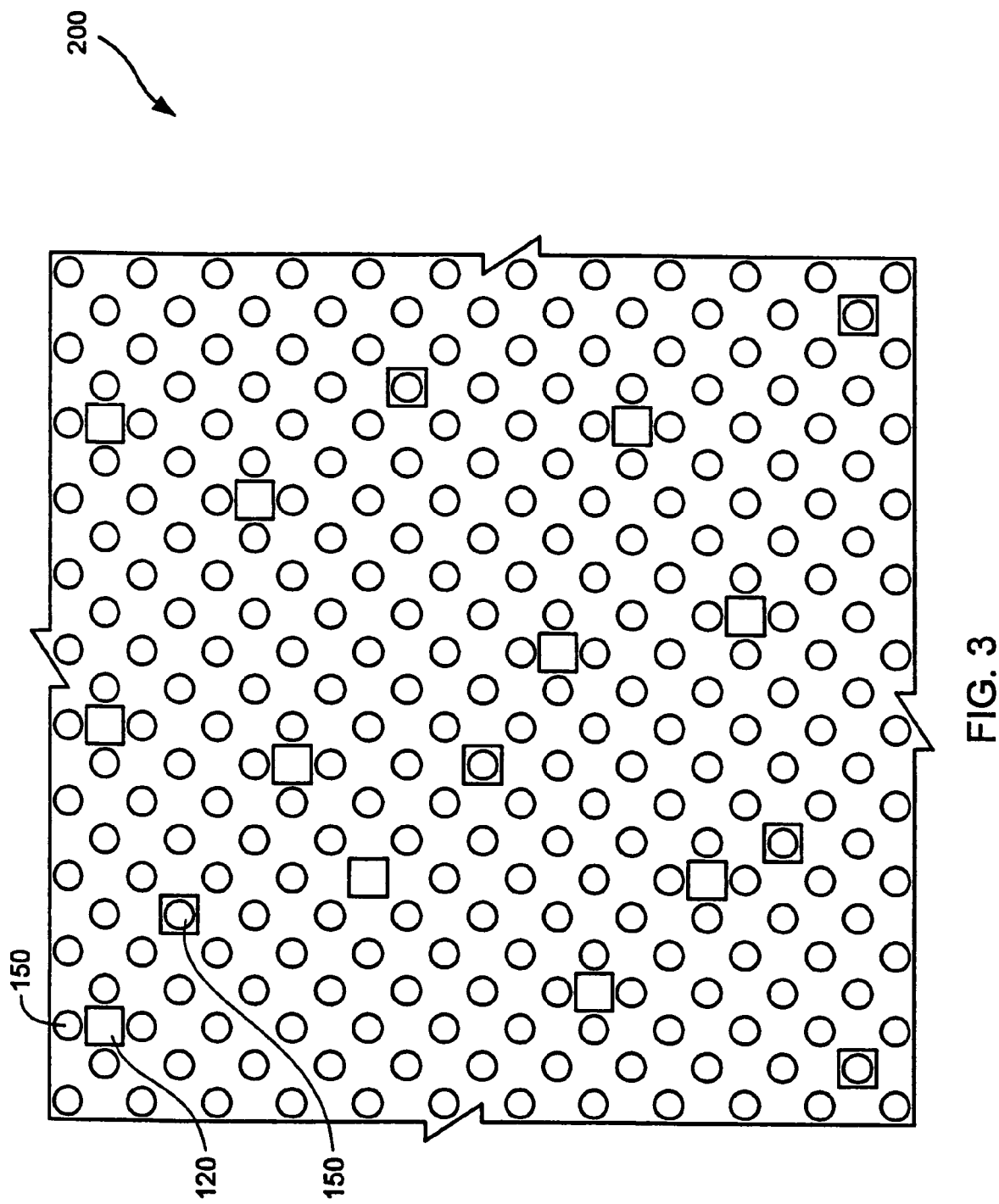
FIG. 3 is the two-dimensional top view of FIG. 2 with the addition of computation points in relation to the seismic sensors.

Turning to FIG. 3, view 200 of FIG. 2 is augmented with a number of receiver locations 150. Receiver locations 150 are physical regions for which an image, or output trace, is to be computed based on input traces obtained at various source locations 120.

Further, in the proceeding discussion, the present invention is described in relation to Kirchhoff and finite difference wave equation algorithms. It should, however, be recognized that various embodiments of the present invention can be applied to a number of different algorithms. In describing the systems and methods of the present invention, knowledge about the Kirchhoff and wave equation algorithms attributable to one of ordinary skill in the art is assumed. Additional details applicable to these algorithms can be found in various references including the following: Paraxial Ray Kirchhoff Migration, Geophysics Vol. 53: No 12, December 1988, pp. 1540–1546; Seismic Data Processing, Society of Exploration Geophysicist Press, 2001, pp. 750–775; Antialiased Kirchhoff 3-D Migration, D. Lumley, John Claerbout, Stanford University, Stanford Exploration Project, pp 1282–1285; and Frequency Selective Design of the Kirchhoff Migration Operator, Gray, S. H. 1992, Geophysical Prospecting, 40, 565–571. The referenced portions of the foregoing publications are included in Appendix A attached hereto.

In the past, such computation may have been done using clusters of computer processors. As used herein, a computer processor, general purpose computer, or general purpose processor is or includes a general purpose CPU. Such computer processors could be, for example, a Pentium processor manufactured by INTEL™ and sold as part of a general purpose computer manufactured by DELL™. Other exemplary processors can be obtained from INTEL™, AMD™, SILICON GRAPHICS™, or the like. In some cases, the chosen general purpose processors can include any processors capable of operating a UNIX™/LINUX™ based computer.

It has been found that such general purpose computers are inefficient. This inefficiency can be attributed at least in part to the general nature of the computer processors. In part to address this inefficiency, various systems and methods of the present invention utilize a number of amorphous hardware elements programmed under the direction of one or more computer processors. As used herein, an amorphous hardware element can be any group of configurable hardware structures that can be defined to perform a particular function. Such configurable hardware structures can be gates, transistors, and/or blocks. As one example, an amorphous hardware element can be an FPGA, some portion of an FPGA, or multiple FPGAs. Thus, for example, a single field programmable gate array can include a number of amorphous hardware elements. In general, an amorphous hardware element typically includes hundreds or more gates that can be configured to provide a specific function. In turn, the hardware structures can be re-configured to provide another function. Of note, the configuration can be very efficient as it is designed to perform a specific pre-defined function, in contrast to a computer processor that is designed to perform any number of functions through software execution.

In some embodiments of the present invention, a general purpose computer will run less computationally intensive parts of a given algorithm, while a computationally intensive part of the algorithm is performed on one or more amorphous hardware elements tailored to perform such computationally intensive part in a highly efficient manner. Thus, in this case, it is only necessary to port a small part of a given algorithm (the computationally intensive part) for implementation on an FPGA or some portion thereof, while the remainder of the algorithm typically already programmed in a standard programming language such as "C" or FORTRAN can be executed by the general purpose computer. This minimizes the amount of the algorithm that must be modified or "ported", while still attaining most if not all of the possible performance increase.

As one example, the aforementioned approach can be applied to a seismic imaging algorithm that consists of the following less computationally intensive functions performed by a general purpose computer: provide a user interface with help screens; check user parameters for consistency; check seismic data files; build a database of seismic traces; select one or more of the seismic traces for processing based on user parameters; allocate output files; read seismic traces from disk; and distribute the seismic data to one or more amorphous hardware elements. In turn, the amorphous hardware elements are programmed to: receive the seismic data; preprocess the seismic data, filter the preprocessed seismic data, and image the seismic data. Then, the imaged seismic data can be accessed by the general purpose computer from a memory associated with the amorphous hardware elements, and the general purpose computer performs the relatively less computationally intensive functions of: printing one or more progress messages to a log file, and outputting the processed seismic data.

In one implementation where the algorithm implemented is a Kirchhoff prestack time migration, only about two thousand lines of "C" code must be ported for execution on FPGAs, out of a total of approximately thirty-five thousand lines of code. Such an algorithm is executed in much the same way as it does when it is executed on one or more general purpose computers up until it reaches the preprocessing and imaging functions. At this point the data is passed via a one Gbyte/sec connection from a general purpose computer to the FPGA using shared memory objects to perform the transfer. Such processes can be used in relation to, for example, an HC-62M architecture implemented by STAR BRIDGE SYSTEMS™. This allows for communication between the "C" code on the general purpose computer, and the VIVA™ code used to program the FPGAs.

Figure 4:
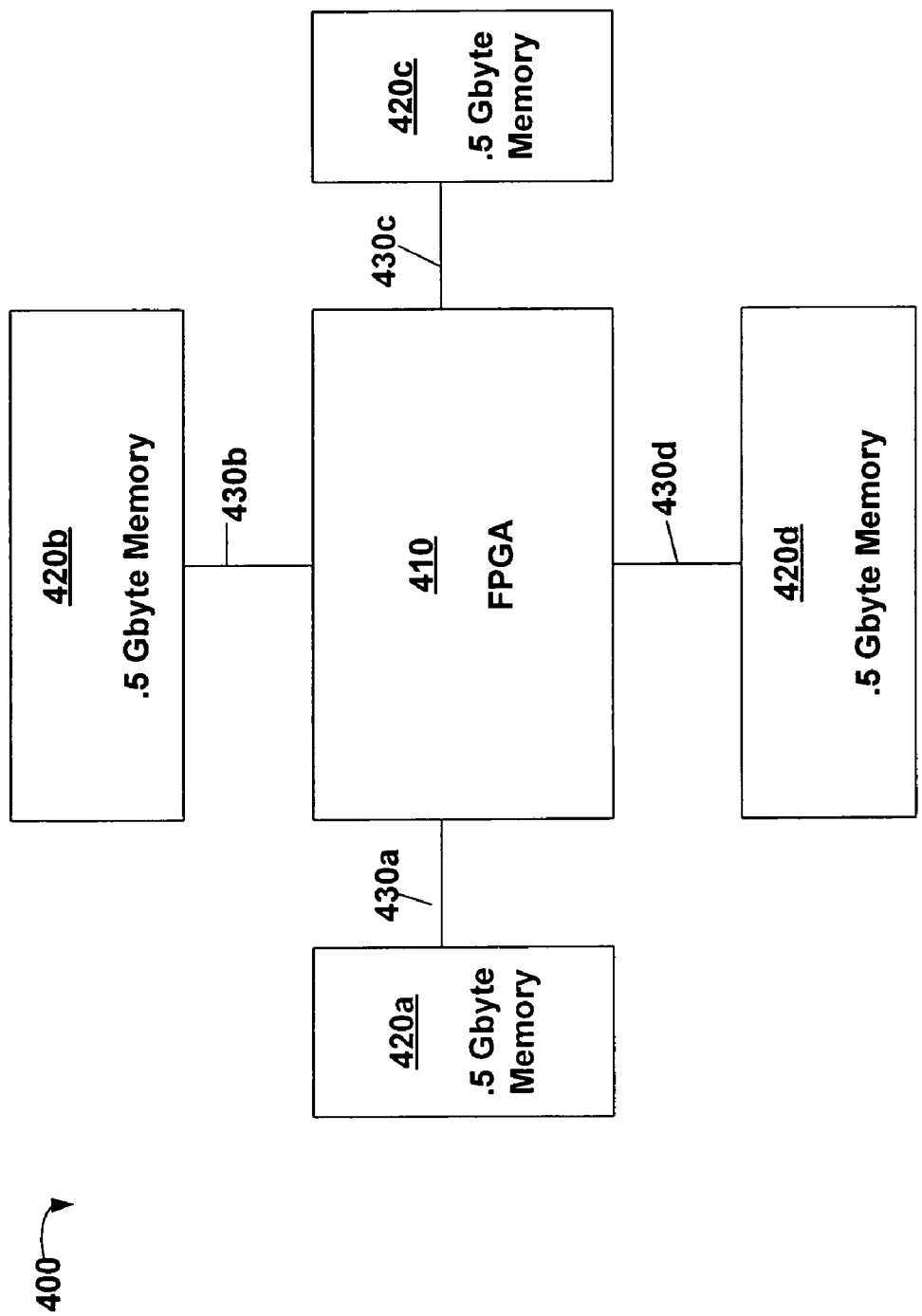
FIG. 4 illustrates an FPGA based on an amorphous hardware system that can be used in relation to embodiments of the present invention.

One particular configuration of an FPGA based system 400 useful in accordance with some embodiments of the present invention is illustrated in FIG. 4. In particular, system 400 has two Gbytes of memory 420 surrounding and directly coupled to an FPGA 410, and a one Mbyte memory onboard FPGA 410. The two Gbytes of memory can be arranged as four five hundred Mbyte memories 420*a*, 420*b*, 420*c*, 420*d* each coupled to, for example, a VirtexII 6000 FPGA via four dedicated ninety four bit busses 430. Based on the disclosure provided herein, one of ordinary skill in the art will appreciate a number of other FPGAs, memory sizes, and/or configurations that can be used in accordance with embodiments of the present invention.

In a seismic imaging operation in accordance with particular embodiments of the present invention, a number of amorphous hardware elements within FPGA 410 are programmed to implement a number of processing pipelines operable to migrate input traces into output traces. Further, an output image is initialized in memory 420 of system 400. Then, a general purpose computer communicably coupled to system 400 reads a set of input traces and loads the input traces directly into the onboard memory of FPGA 410. Depending on the length of the input traces, approximately five hundred input traces can be loaded into FPGA 410. At this point, approximately one hundred output traces from memory 420 are transferred to the memory onboard FPGA 410. Once the output traces are loaded into FPGA 410, the processing pipelines are started. As the processing pipelines that will merge a first set of input traces into a first set of output traces are started, a second set of one hundred output traces are loaded into the memory onboard FPGA 410. Thus, the output traces are introduced into FPGA 410 via a double buffering mechanism, allowing each stage of the processing pipeline to operate continuously. After the set of input traces are migrated into the first set of output traces, the result is placed back into memory 420, and the processing pipeline is free to produce the next set of results based on the second set of output traces. This process continues until the input traces are migrated into the full two Gbytes of output traces maintained in memory 420. At this point, the general purpose computer delivers another set of input traces to FPGA 410, and the process continues until all input traces have been migrated into the output image traces.

The achievable performance is controlled by, among other things, the size of memory 420, and the ability to assure that each processing stage of the processing pipelines are maintained busy. In one embodiment of the present invention, to store as many traces as possible, the trace samples are converted from a standard thirty-two bit data type, to a data type smaller than thirty-two bits. For example, depending on the dynamic range of the data, it can be possible to store the trace samples in as small as eight bits without losing any accuracy. VIVA™ and FPGA 410 accommodate this by allowing use of any arbitrary bit length to store the trace samples. As a result, three to four times as many traces can be maintained in memory 420 at any given time. Reducing the data size also allows for more processing pipelines to be programmed in a given FPGA as the width of the processing pipelines can be reduced to match the data width. This leads to additional performance increases as more pipelines can be run in parallel.

Some seismic imaging operations, such as the Kirchhoff algorithm, can include use of processing pipelines that perform a number of serial operations, with the overall processing pipeline being hundreds of clock cycles long. Since each input sample can be migrated into a corresponding output trace independent of other input samples, a very high degree of parallelism can be achieved within one or more FPGAs. As exemplary FPGAs typically include millions of hardware gates, thousands of such processing pipelines can be implemented and operated simultaneously on a single FPGA. Because the processing pipelines are maintained in a continuously busy state, once they complete their first cycle of migration from input trace to result, a result can be derived from each of the processing pipelines for each clock cycle, rather than achieving a result per one hundred clock cycles or more required by a general purpose computer.

The general process described above in relation to a seismic imaging algorithm can be used for any algorithm, and is particularly suited for algorithms including computationally intensive portions along with portions not including such computational intensity. Of course, implementation of a different algorithm will typically require implementation of different processing pipelines. For instance, a Kirchhoff algorithm consists of filters and interpolators, while a wave equation algorithm will consist of matrix solvers. While these changes are required, the general process remains the same. Some exemplary algorithms that can be implemented using this general process include, but are not limited to, Kirchhoff prestack time migration, Kirchhoff prestack depth migration, ray tracing travel time generation, finite difference wave equation migration, two-way finite difference wave equation or reverse time migration, tomographic velocity analysis, forward modeling, and/or the like. Indeed, the increased performance offered through use of such systems may make new, more complex algorithms feasible.

As further described below in relation to FIG. 5, the systems and methods of the present invention can be implemented in relation to a single system 400, or in relation to multiple systems each including one or more FPGAs. In general, more gates are available where more FPGAs are used. Thus, more parallel processing pipelines can be implemented and operated simultaneously increasing the overall system throughput when additional FPGAs are used. In addition to an increased number of gates, a corresponding increase in memory size is also received, thereby allowing an increase in the image space. Since the image space is larger, a larger image can be produced each time a set of input traces is processed. In some cases, this can result in a greater than linear speedup by adding additional systems 400.

Figure 5:
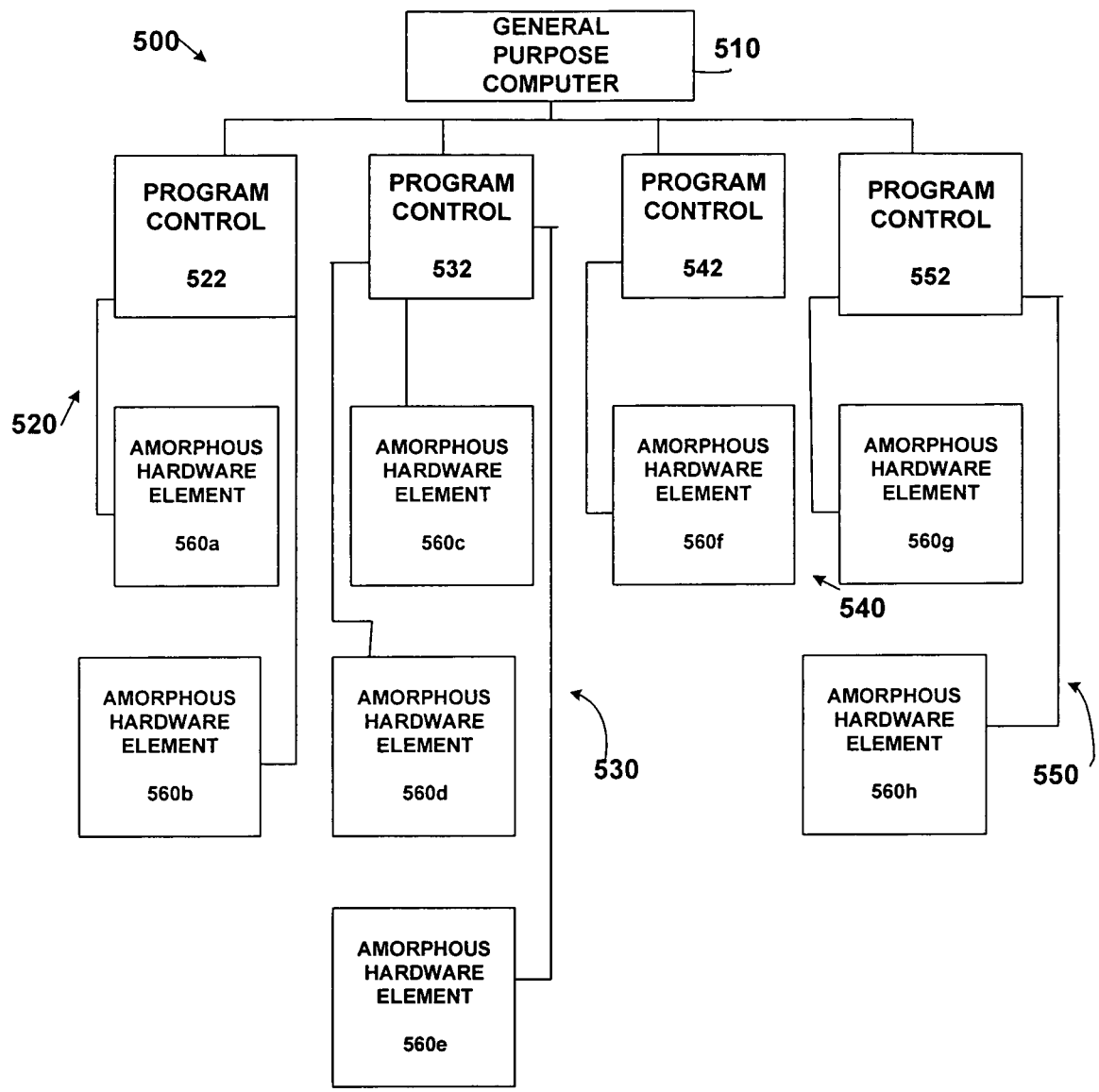
FIG. 5 illustrates an amorphous computing system in accordance with some embodiments of the present invention.

FIG. 5 illustrates an amorphous computing system 500 in accordance with some embodiments of the present invention. System 500 includes a general purpose computer 510 communicably coupled to a number of configurable hardware banks 520, 530, 540, 550. Each of the hardware banks 520, 530, 540, 550 includes one or more amorphous hardware elements 560 controlled by a respective program controller 522, 532, 542, 552. In some cases, a respective program controller 522, 532, 542, 552 is associated with hundreds, thousands, or even more amorphous hardware elements. One such case is where each of the amorphous hardware elements associated with a given program controller are a subset of hardware gates available on an FPGA. In one particular example, hundreds of amorphous hardware elements 560 are implemented in a VirtexII 6000 FPGA that is surrounded by two Gbytes of memory as previously described in relation to FIG. 4 above.

In one particular case, program controllers 522, 532, 542, 552 can be application specific integrated circuits (ASICs) capable of transferring information between general purpose computer 510 and one or more of the amorphous hardware elements 560. Thus, for example, program controllers 522, 532, 542, 552 can be general purpose interfaces capable of receiving a set of input seismic traces from general purpose computer 510, and writing the input seismic traces to one of the amorphous hardware elements 560. In addition, general purpose computer 510 can transfer programming information to program controllers 522, 532, 542, 552, and in turn, the program controllers program the respective amorphous hardware element 560 using the programming information. Yet further, program controllers 522, 532, 542, 552 can accept results from respective amorphous hardware elements 560 and upload those results to general purpose computer 510. Alternatively, program controllers 522, 532, 542, 552 can be implemented as part of general purpose computer 510. Based on the disclosure provided herein, one of ordinary skill in the art will appreciate the variety of implementations possible for program controllers 522, 532, 542, 552.

As depicted, system 500 includes one or more amorphous hardware elements 560 communicably coupled to a particular program controller 522, 532, 542, 552 within hardware banks 520, 530, 540, 550. In some cases, hardware banks 520, 530, 540, 550 are created with differing levels of compute power by associating different numbers of amorphous hardware elements 560 within the respective hardware banks 520, 530, 540, 550. In such cases, each of the amorphous hardware elements 560 can be identical elements. Alternatively, each of the hardware banks 520, 530, 540, 550 may contain the same number of amorphous hardware elements 560. In some cases, this results in the same compute power for each of the hardware banks 520, 530, 540, 550. It should be recognized that the hardware banks can be implemented within a common FPGA such as that of FIG. 4 above, or across a number of FPGAs using system 400 above as a building block. In one particular implementation, each hardware bank is implemented in a single FPGA. Thus, in such implementations, the terms "hardware bank" and FPGA become synonymous. Further, it should be recognized that system 500 can be implemented with only a single hardware bank consisting of thousands or more amorphous hardware elements.

In some embodiments where the hardware banks 520, 530, 540, 550 have differing levels of compute power, the program controller 522, 532, 542, 552 associated with the respective hardware bank 520, 530, 540, 550 is programmed to indicate the compute power associated with the hardware bank. Such compute power can be indicated in number of programmable gates, number of transistors, clock speed, amount of memory, and/or a combination thereof. Further, this compute power can be recorded as an aggregate of all amorphous hardware elements 560 within the given hardware bank where the hardware bank is comprised of multiple FPGAs, on an individual amorphous hardware element basis, or both. In some cases, program controllers 522, 532, 542, 552 are implemented to read the various amorphous hardware elements 560 and to report information read, while in other cases, program controllers 522, 532, 542, 552 are hard coded with the information. Further, in some cases, program controllers 522, 532, 542, 552 are implemented to perform a self-test including a test of each of the associated amorphous hardware elements to determine operational functionality of the hardware elements. This can be done, for example, when the hardware banks are powered on, or at some other time under the direction of general purpose computer 510.

General purpose computer 510 can read compute power information from each of program controllers 522, 532, 542, 552, and distribute computations based on the available compute power. Thus, as just one example, where hardware bank 520 offers twice the number of programmable gates and twice the amount of memory as hardware bank 540, general purpose computer 510 can distribute twice the number of seismic input traces for computation to hardware bank 520 when compared to hardware bank 540. Such an approach provides for increased scalability and the ability to use legacy hardware banks in conjunction with newer hardware banks. General purpose computer 510 can distribute computational functions such that each of the hardware banks 520, 530, 540, 550 will generate results in approximately the same amount of time, which can be used to increase the parallel nature of amorphous computing system 500.

Further, general purpose computer 510 can direct certain more complex computational functions to one hardware bank over another, one FPGA over another, and/or one group of amorphous hardware element over another. Thus, some of the hardware banks and/or amorphous hardware elements can be tasked with computational functions commensurate with the compute power offered thereby. In this way, amorphous hardware elements and/or hardware banks with increased compute power can be more efficiently used for more complex computation, while retaining some use for older, low powered devices. Such an approach can increase the useful lifetime of system 500 by providing a piecemeal growth cycle for system 500.

In some cases, where the amorphous hardware elements are implemented in FPGAs, programming such amorphous hardware elements can be complicated. Various tools exist for programming FPGAs that are typically incompatible with computer programming languages such as C, FORTRAN, and the like. For example, some tools require a hardware schematic that is compiled to program an amorphous hardware element, while others utilize hardware design languages such as VHDL to program amorphous hardware elements. To simplify programming and operation of amorphous computing systems of the present invention, a programming language called VIVA™ provided by STAR BRIDGE SYSTEMS™ can be used. In the seismic imaging implementation described above, much of the setup, transfer and computations are programmed in a traditional computer programming language and performed by a general purpose computer. Other, more computationally intensive portions are programmed using the VIVA™ language and performed on one or more FPGAs. As previously discussed, because the computationally intensive portion of a program can be only a percentage of the overall program, only a relatively small amount of a program may need to be implemented in the VIVA™ language.

More specifically, the aforementioned seismic imaging program may include the following functions: provide a user interface including help menus and screens, check user parameters for consistency, check seismic data files, build a database of seismic traces, select the seismic traces for processing based on user parameters, allocate output files, read seismic traces from disk, distribute programming to the amorphous hardware elements, distribute data to the amorphous hardware elements, preprocess and filter the seismic data, image the seismic data, retrieve the results from the amorphous hardware elements, and output the imaged seismic data. Of these functions, the preprocess, filter and imaging functions are implemented in the VIVA™ language, while the other functions are implemented in traditional computer code such as "C" or FORTRAN.

In some embodiments of the present invention, nodular algorithms can be ported to operate on amorphous computing systems by assigning portions of the algorithm functioning on a computer node to one or more amorphous hardware elements. As used herein, a nodular algorithm is any computer program that is designed to operate on a number of computer nodes. As an example, a nodular algorithm may include a number of nodular algorithmic processes that can each be assigned to and completed by a node within a nodular computing system. Various examples of nodular computer systems and method for using such are provided in U.S. Pat. App. No. 10/434,723, entitled "SYSTEMS AND METHODS FOR PROCESSING COMPLEX DATASETS", and filed by Kamps on May 8, 2003. The entirety of the aforementioned patent application is incorporated herein by reference for all purposes.

Using the seismic imaging example, where the preprocessing, filtering, and imaging would have been spawned as a number of nodular algorithmic processes for computation on a various nodes, the application can operate on an amorphous computing system of the present invention in much the same way as it operates on a nodular system up until it gets to the point where it distributes the data to the various computer nodes. These computer nodes can be functionally replaced by amorphous hardware elements, with the code that operated on the various computer nodes ported for operation on the amorphous hardware elements. Communication objects can be defined to pass data from the amorphous hardware elements to the general purpose computer.

In one implementation, a memory is associated directly with the various amorphous hardware elements, and a seismic image is created in the memory. In one particular configuration, eighteen Gbytes of memory is associated with the amorphous hardware elements. With this system, an eighteen Gbyte image can be created. To produce this output image, approximately a terabyte of data from disk can be read from disk and distributed to the amorphous hardware elements to create the eighteen Gbyte image.

Figure 6:
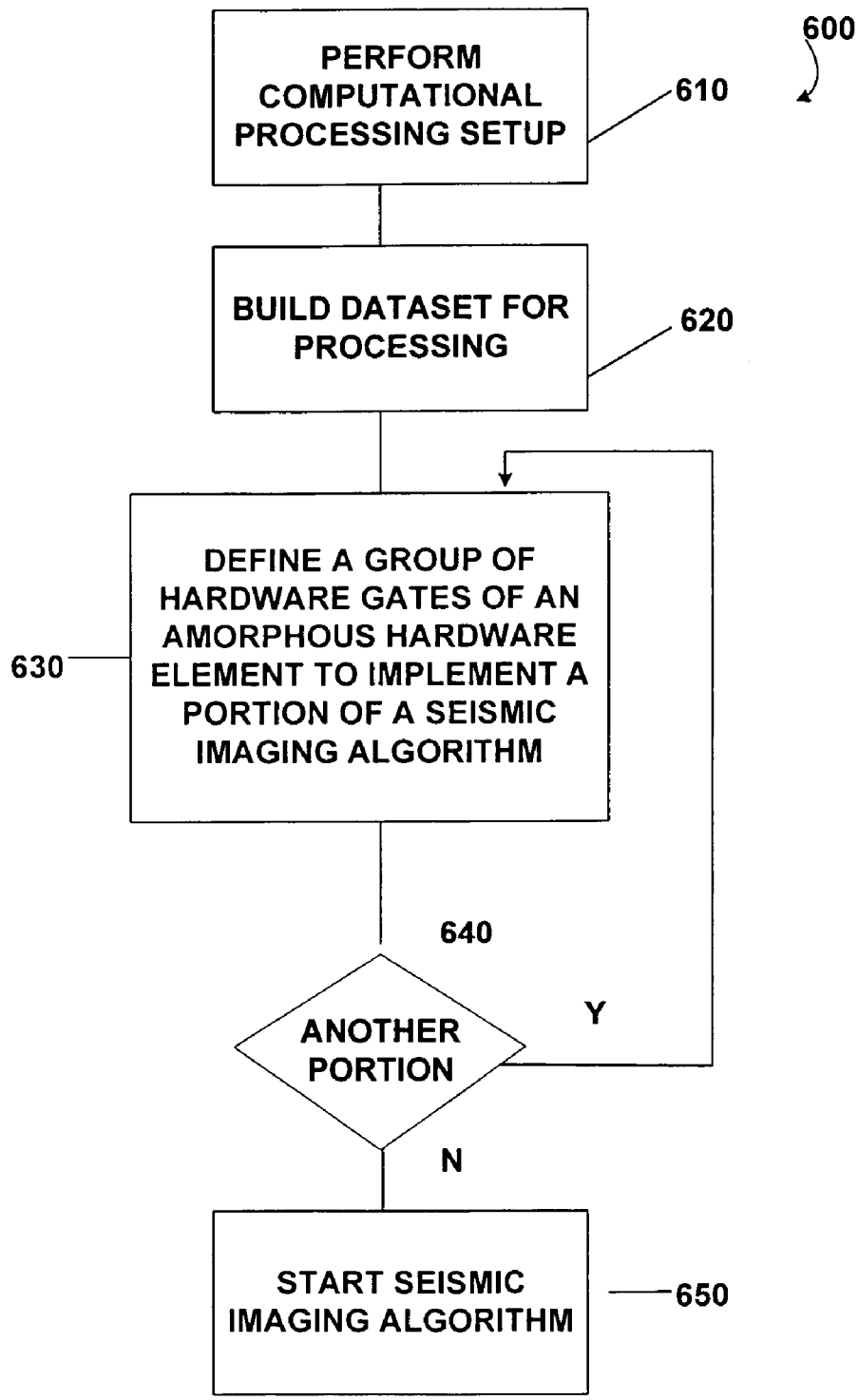
FIG. 6 is a flow diagram of an exemplary method for utilizing an amorphous computing system in accordance with some embodiments of the present invention.
Figure 1:
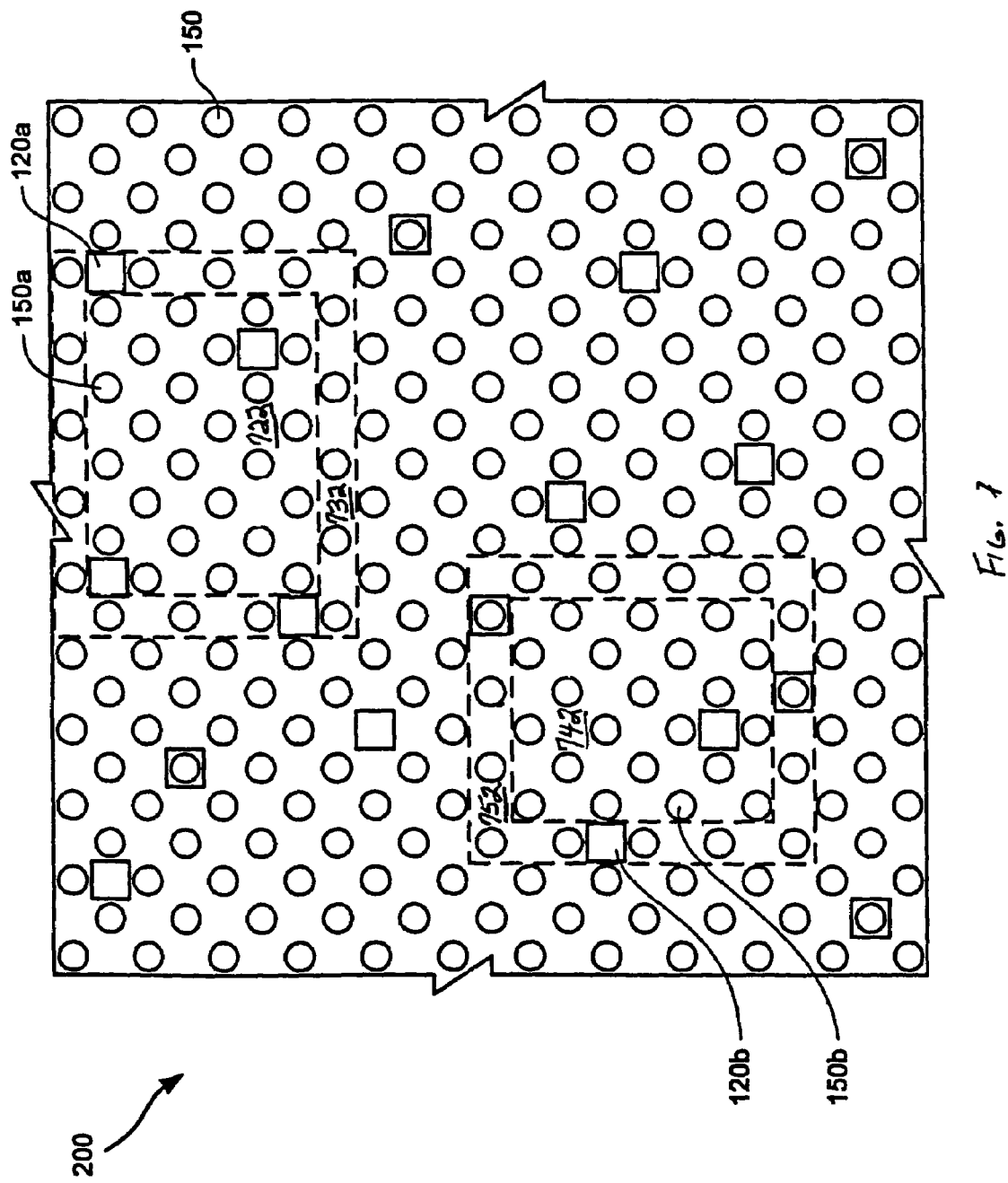

Turning to FIG. 6, a flow diagram 600 depicts one method for implementing one or more algorithms in accordance with some embodiments of the present invention. Following flow diagram 600, computational processing is initialized using a general purpose computer (block 610). This can include, for example, initializing an output image file for seismic image processing, and reading a number of seismic input traces. A dataset for processing can be built from the input traces (block 620). This can include segregating the various input traces into sets for distribution to individual amorphous hardware elements.

One example of segregating or dividing a dataset for processing on amorphous hardware elements is illustrated as FIG. 7. Turning to FIG. 7, receiver location 150*a* may rely heavily on input trace data from source location 120*a* to perform a proper computation, while such computation may not be impacted by input trace data from source location 120*b*. Similarly, receiver location 150*b* may rely heavily on input trace data from source location 120*b* to perform a proper computation, while such computation may not be impacted by input trace data from source location 120*a*. Thus, there is little or no need to pass input trace data from source location 120*a* to the node computing an output trace for receiver location 150*b*, nor to pass input trace data from source location 120*b* to the node computing an output trace for receiver location 150*a*. Accordingly, the dataset (represented by all input trace data associated with the squares) can be segregated or divided as necessary.

The segregation or division may include identifying a group of trace outputs (represented as the circles within areas 722, 742) that will be assigned to amorphous hardware elements. For example, in one embodiment, trace data from sensors within a particular distance from a location may be assigned to a particular amorphous hardware element. Then, all input trace data (again represented by the squares) that is relevant to the identified nodes is assembled into a data section. Thus, for example, for amorphous hardware elements representing data within area 722, the data section may include all input trace data within area 732. Alternatively, for amorphous hardware elements representing data within area 742, the data section may include all input trace data within area 752. These respective data sections are then assigned to amorphous hardware elements. In particular applications of seismic imaging on an amorphous computing system in accordance with the present invention, approximately five hundred seismic input traces can be loaded into each FPGA that in turn supports a number of amorphous hardware elements.

Returning to FIG. 6, a group of hardware gates in an amorphous hardware element are programmed, or defined, to implement a portion of a seismic imaging algorithm (block 630). This can include programming groups of hardware structures in an FPGA to create a processing pipeline implementing particular functions of the seismic imaging algorithm. Thus, in some cases, methods known in the art for programming an FPGA can be utilized in relation to the processes of block 630. It is then determined if additional portions of the seismic imaging algorithm remain to be programmed (block 640). Where an additional portion is to be programmed (block 640), the processes of block 630 are repeated. Thus, where for example one thousand pipelines are to be programmed, the processes of blocks 630 and 640 are completed a total of one thousand times—one time for each of the respective pipelines. In such cases, the seismic imaging algorithm is performed by many pipelines with each of the pipelines performing the same algorithm, and operating independent of each other. For purposes of discussion, each of these respective pipelines can be considered "portions of the seismic imaging algorithm". Alternatively, where the programming is completed (block 640), the programmed seismic imaging algorithm is started (block 650). Operation of the programmed amorphous hardware element can include accessing output traces from the memory associated with the amorphous hardware elements, and loading the output traces into memory internal to the amorphous hardware elements. When a chip has a set of output traces loaded into the onboard memory, the input traces are shifted and summed into the output trace. Since each sample to be summed into the output trace can be computed independently of all the other samples on the output trace, a high degree of parallelism can be achieved. Based on this disclosure, one of ordinary skill in the art will appreciate the computational power that can be achieved using systems and methods in accordance with the present invention.

The aforementioned computation (block 650) can be, as just one example, a Kirchhoff time migration. The basic operation of the Kirchhoff migration is to shift, filter and sum a sample of an input trace, into each output trace that it contributes to. So if an input trace of one thousand samples is taken, it will be summed into an output trace of one thousand samples. This gives the equation: output(k)=output(k)+input(time), where k is an integer that goes from one to one thousand, and time is some floating point value that goes from zero to the length of the trace. The complexity of the algorithm comes from the fact that the shift will not be of unit sample amounts, that is energy at sample 10.75 may sum into output sample 6.0. Thus, the input traces need to be interpolated. Second, is that this shift changes as we move along the length the trace, and in fact no two sample shifts are exactly the same. So while sample 10.75 may sum into output sample 6.0, sample 11.72 may sum into output sample 7.0, and sample 12.68 may sum into output sample 8.0. Increasing the output sample by one, changes the time of the input value by a value other than one.

In addition, the filter operation is also theoretically unique for each sample. The data for the trace that sums into output sample 10.0 may need to be filtered at 26 Hertz, while the data that sums into output sample 11.0 may need to be filtered at 28 Hertz. It is very possible that no two samples are exactly the same. In existing systems, to interpolate each input sample to exactly the input sample needed to sum into the output trace is too expensive. In existing systems, exact interpolation is replaced by interpolating the full input trace by a factor of eight, and then taking the closest fraction that is needed. Thus, if a sample of 2.72 is needed, a sample of 2.625 is used in its place. As will be appreciated, an estimation error is created in this process.

An amorphous computing system in accordance with the present invention can be used to obtain exact interpolation, thus avoiding the aforementioned estimation errors. More specifically, for each output sample the time (sample number plus fraction) is calculated from the input trace using a twenty point sinc function to exactly interpolate the input trace to the needed fractional sample value. This is done as a portion of a processing pipeline implemented in an amorphous hardware element. Furthermore the exact frequency that the sample needs to be filtered to is calculated using another twenty point filter implemented in another portion of the processing pipeline. Not only does this approach provide a more accurate answer, but it is in fact simpler. This is in part because two twenty point filters are being used allowing for easy combinations of the two sets of coefficients into one twenty point filter, that will get applied to the input trace. For each output sample, a slightly different set of coefficients exist, but the twenty point filter can always be used.

An exemplary processing pipeline performs the following functions at different stages of the pipeline: (A) interpolate the velocity function to the image point (also referred to as the output sample), (B) calculate the input sample number and fraction that will sum to the image point (this is the contributing sample number), (C) filter the input trace to produce twenty filtered samples straddling the contributing sample number; (D) interpolate the filtered samples to the contributing sample number using a twenty point sinc filter, and (E) sum the filtered sample into the output sample. Each of these processing stages can take many clock cycles with the entire processing pipeline taking hundreds of clock cycles.

A user (e.g., a geophysicist) implementing the process provides a velocity model (or velocity function) as part of the input data. This velocity model provides the velocity of sound through various rock layers and/or other layers in the earth at an area where the input trace data was collected. This velocity is typically estimated by the user. In some cases, the estimate may be iteratively refined utilizing the results from running a Kirchhoff migration algorithm. In the aforementioned stage "A" of the processing pipeline, this velocity model is interpolated to an image point, producing an interpolated velocity at the image point. Such an interpolation can be a linear interpolation between velocities supplied at known locations, and the location of the image point. The interpolated velocity function is utilized in a function, F(Vrms, Ds, Dr), designed to calculate the time of the input trace that corresponds to a desired image point. In the function, Vrms is the interpolated root mean square velocity of sound through the earth. Ds is the distance to the source (e.g., source location 120a of FIG. 1) of the input trace from the measurement location (e.g., receiver location 150a), and Dr is the distance to the receiver location (e.g., source location 120b of FIG. 1) from the measurement location (e.g., receiver location 150a). The following provides one example of the function F(Vrms, Ds, Dr):

sqrt[(Ds*Ds)/(Vrms*Vrms)]+sqrt[(Dr*Dr)/(Vrms*Vrms)]

Based on the disclosure provided herein, one of ordinary skill in the art will recognize a number of other equations that can be used to implement the function F(Vrms, Ds, Dr).

The input trace is a recording at a sensor location (i.e. source location 120b of FIG. 1) over a period of time after a sound wave or shot has been set off from a source (i.e., source location 120a of FIG. 1). The input trace is recorded in discrete samples at a sample rate of one sample/Dt milliseconds, where Dt is the sample rate. To perform the Kirchhoff migration algorithm, it is determined which of these discrete samples included in the input trace contribute to the calculation of the image point. This determination is performed in the aforementioned stage "B" of the processing pipeline where the following function is implemented:

Sample Number=Time/*Dt*

This calculated sample number is a floating point value, and as such is not exactly correlated to any one of the discrete samples included in the input trace. Therefore, this "real" sample number must be interpolated from other "whole" sample numbers within the input trace. This interpolation is performed in a subsequent stage of the processing pipeline described below.

At stage "C" of the processing pipeline, the input trace is filtered to produce twenty filtered samples straddling the contributing sample number calculated in the preceding stage "B" of the processing pipeline. This anti-aliasing filtering removes unreliable frequency components included within the input trace. Calculating the frequency at which to filter is done by implementing a function, F(Vrms,Sa,Sb). The following is one example of such a function:

Dp=8 *sqrt[(Sa*X_distance_spacing*X_distance_spacing)+(Sb*Y_distance_spacing*Y_distance_spacing), where Sa is the lateral distance in the x direction between the input trace and the image point and Sb is the lateral distance in the y direction between the input trace and the image point, and where X_distance_spacing is the distance between input trace rows in the x dimension and Y_distance_spacing is the distance between input trace rows in the y dimension.

Kp=Dp*Dt/(Vrns*Time), where Vrms is the interpolated velocity provided from the aforementioned stage "A" of the processing pipeline, Time is the calculated time of the input trace from the aforementioned stage "B" of the processing pipeline that contributes to the image point, and Dt is the sample rate of the input trace typically measured in milliseconds.

Filter Frequency=512/(2*Dt*Kp)

Based on this disclosure, one of ordinary skill in the art will appreciate other functions that can be implemented to serve the function of F(Vrms, Sa, Sb). The following references provide additional information about anti-aliasing in relation to a Kirchhoff migration: Anti-aliased Kirchhoff 3-D migration, D. Lumley, John Claerbout, Stanford University, Stanford Exploration Project pp. 1282–1285; and Frequency Selective design of the Kirchhoff migration operator, Gray, S. H. 1992, Geophysical Prospecting, 40, pp. 565–571. The referenced portions of the foregoing publications are included in Appendix A attached hereto.

Based on the calculated Filter Frequency, a set of coefficients for a high frequency filter are accessed. These coefficients are pre-calculated by the program before any of the input traces are processed through the processing pipeline. The following function implemented in "C" code is exemplary of one method of calculating the coefficients for a Butterworth filter that gets a number of poles and assures that the poles are even. In the function, for each pole pair three coefficients are determined, and these coefficients along with the poles are stored.

```
void filter_trace( int npairs, int nstart, int nend, float *coeff_array, float
*trace_in, float *trace_out);
void bfdesign (float fpass, float apass, float fstop, float astop,int
*npoles, float
*f3db);
main( ) {
int i,npoles,npairs,jpair,filt_indx;
float fpass,apass,fstop,astop,f3db,coeff_array[50][30*3],
a,b1,b2,r,theta,scale,trace_in[1000],trace_out[1000];
    for(i=0; i< 50; i++) { /* Assign freq, nyquist = .5 */
        fpass = .50 - (float)i * .01;
        apass = .99;
        fstop = MIN(fpass + .05,.499);
        astop = .05;
        bfdesign ( fpass, apass, fstop, astop, &npoles, &f3db);
        if( npoles % 2 > 0)
        npoles ++;
        printf("fpass %f fstop %f npoles %d f3db
%f\n",fpass,fstop,npoles,f3db);
        npairs = npoles / 2;
        coeff_array[i][0] = npairs;
        r = 2.0*tan(PI*fabs((double)f3db));
        for(jpair=0; jpair< npairs; jpair++){
```

```
        theta = PI*(2*jpair+1)/(2*npoles);
        scale = 4.0+4.0*r*sin(theta)+r*r;
        a = r*r/scale;
        b1 = (2.0*r*r-8.0)/scale;
        b2 = (4.0-4.0*r*sin(theta)+r*r)/scale;
        coeff_array[i][jpair*3+1] = a;
        coeff_array[i][jpair*3+2] = b1;
        coeff_array[i][jpair*3+3] = b2;} }
    filt_indx = 10;
    filter_trace( coeff_array[10][0], 600, 640, coeff_array[10],
trace_in, trace_out) }
```

A filter implemented as part of stage "C" of the processing pipeline is then used to filter a group of input trace samples that straddle the calculated Sample Number from stage "B" of the processing pipeline. In some cases, twenty samples straddling the Sample Number are used to interpolate. Thus, where twenty samples are used to interpolate the fractional Sample Number, ten samples on either side of the Sample Number are filtered resulting in twenty samples of the input trace filtered to the desired frequency. As one example, a Butterworth filter relying on the previously described coefficients can be implemented as part of stage "C" to perform the filtering. The following is a C-language implementation of an exemplary Butterworth filter that copies samples into the output trace for a given range, loops over the identified pole pairs using the previously calculated pole coefficients, and applies the filter. Based on the disclosure provided herein, one of ordinary skill in the art will appreciate a number of other filter techniques and/or implementations that can be used in accordance with the present invention. For example, an ordinary convolution could be used.

```
void filter_trace( int npairs, int nstart, int nend, float *coeff_array, float
*trace_in, float *trace_out)
{
int j,jpair;
float a,b1,b2,pjm2,pjm1,pj,qjm2,qjm1;
    for (j=nstart; j<nend; j++)
        trace_out[j] = trace_in[j];
    for(jpair=0; jpair < npairs; jpair ++) {
        a = coeff_array[jpair*3+1];
        b1 = coeff_array[jpair*3+2];
        b2 = coeff_array[jpair*3+3];
        pjm1 = 0.0;
        pj = 0.0;
        qjm2 = 0.0;
        qjm1 = 0.0;
        for (j=nstart; j<nend; j++){
            pjm2 = pjm1;
            pjm1 = pj;
            pj = trace_out[j];
            trace_out[j] = a*(pj+2.0*pjm1+pjm2)-b1*qjm1-b2*qjm2;
            qjm2 = qjm1;
            qjm1 = trace_out[j];}}return;}
```

At stage "D" of the processing pipeline, the twenty filtered input trace samples from stage "C" are interpolated through application of a twenty coefficient sinc filter to determine the fractional distance between the calculated sample and the calculated sample+1. As with the preceding stage, the filter coefficients are pre-calculated by the program before any trace processing begins. From this, a set of coefficients are generated that will allow interpolating a sample to within one tenth of Dt, or the sample rate. To do this, ten sets of twenty coefficients are generated. The following is an exemplary function written in "C" code for producing the coefficients that are a least-squares-best approximation to the ideal obtained through solving a symmetric Toeplitz system for the sinc approximation.

```
void mksinc_0( float d, int lsinc, float *sinc) {
    int j;
    double s[20],a[20],c[20],work[20],fmax;
    fmax = 0.066+0.265*log((double)1sinc);
    fmax = (fmax<1.0)?fmax:1.0;
    for (j=0; j<1sinc; j++) {
        a[j] = dsinc(fmax*j);
        c[j] = dsinc(fmax*(1sinc/2-j-1+d));}
    stoepd(1sinc,a,c,s,work);
    for (j=0;j<1sinc; j++)
        sinc[j] = s[j];}
```

The stoepd function called out in the preceding code segment is expressed below, again in "C" code. As previously discussed, these functions are merely exemplary and one of ordinary skill in the art will appreciate a number of other functions and/or implementations thereof that can be used in relation to the present invention.

```
void stoepd (int n, double *r, double *g, double *f, double *a){
    int i,j;
    double v,e,c,w,bot;
    if(r[0] == 0.0) return;
    a[0] = 1.0;
    v = r[0];
    f[0] = g[0]/r[0];
    for (j=1; j<n; j++){
    /*--------------------------------------*
     * solve Ra=v as in Claerbout, FGDP, p. 57 *
     *--------------------------------------*/
        a[j] = 0.0;
        f[j] = 0.0;
        for (i=0,e=0.0; i<j; i++)
            e += a[i]*r[j-i];
        c = e/v;
        v -= c*e;
        for (i=0; i<=j/2; i++) {
            bot = a[j-i]-c*a[i];
            a[i] -= c*a[j-i];
            a[j-i] = bot;}
    /*--------------------------------------*
     * use a and v above to get f[i], i = 0,1,2,...,j *
     *--------------------------------------*/
        for (i=0,w=0.0; i<j; i++)
            w += f[i]*r[j-i];
        c = (w-g[j])/v;
        for (i=0; i<=j; i++)
            f[i] -= c*a[j-i];}}
```

Of the ten sets of coefficients calculated, the closest to the calculated fractional distance between the calculated sample and the calculated sample+1 is used. A dot product is calculated using the twenty filtered samples and the twenty coefficients resulting in a single sample that represents the interpolated sample, between the calculated sample and the calculated sample+1. An exemplary implementation in "C" code of this function tailored for situations where the fractional distances are non-uniform is provided below.

```
float interp_samp_sinc( float *trace, int samp_base, float frac, int lsinc,
int nsamp) {
    int j,lsinc_h,indx;
    float table[20],sum;
    frac = frac * -1.0;
    mksinc_0( frac, lsinc, table);
    if( samp_base + 1 - lsinc_h >= 0 && samp_base + 1 + lsinc_h <
```

```
                                        -continued nsamp) {
        sum = 0;
        for(j=0; j< lsinc; j++)
        sum += table[j] * trace[samp_base+j+1-lsinc_h]; }
    else {
        sum = 0;
        for(j=0; j< lsinc; j++) {
        indx = MAX(0,samp_base+j+1-lsinc_h);
        indx = MIN(indx, nsamp-1);
        sum += table[j] * trace[indx];}} return sum;}
```

Next, at stage "E" of the processing pipeline, the filtered and interpolated sample is added to the output trace at the image point. It should be noted that the preceding discussion has included examples of filters that one of ordinary skill in the art would know could be replaced with other filter types. Thus, for example, the discussed filters are twenty point filters, but could be replaced with a fifteen point or some other length of filter. Use of such a different filter would still be in accordance with the present invention, the scope of which is set forth in the claims below.

A finite difference wave equation is another example of an algorithm that can be implemented using systems and methods of the present invention. Such an equation is many times more computationally intensive than a Kirchhoff algorithm, and as a consequence it is seldom used in an uncompromised form. If it could be utilized without being compromised, it may produce images far superior to those of the Kirchhoff algorithm. In the prior art, the biggest compromises that are made to the wave equation involve limiting the frequency content of the result to less than twenty Hertz, and the maximum dips that are imaged are typically limited to less than forty-five degrees. It would be desirable to image frequencies higher than fifty Hertz and dips greater than seventy degrees. Furthermore, as now implemented, the data is migrated in the frequency domain which creates other compromises. In particular, to migrate in the frequency domain means that the data is regularized in some way to condition it for the multidimensional Fourier transform. This regularization degrades the input data somewhat.

Using systems and methods of the present invention, the wave equation can be implemented without the previous necessary compromises. The increased processing power offered in various embodiments of the present invention allows for implementation of the finite difference wave equation in the time/depth domain, rather than the frequency domain. Further, because of the implementation in the time/depth domain offset gathers can be output, and images utilizing higher frequencies and steeper dips can be developed.

The general process of implementing the wave equations using systems of the present invention is similar to that described in relation to the Kirchhoff algorithm. The principal difference is in the details of the processing pipeline. For the wave equation an exemplary processing pipeline includes the following stages expressed as loops:

```
    Outer loop over output z grid locations (depth)
        Center loop over output x grid locations
            Inner loop over output y grid locations
                Update the differencing equations
                Tri-diagonal matrix solver
                Thin lens adjustment ( vertical shift for changing
                    velocity gradient)
        End of all three loops
        Update the output image traces.
```

Because the wave equation is a downward continuation function, the outer loop is the loop over the depth increments. With this looped implementation, many levels of parallelism can be achieved, and multiple processing pipelines can be implemented using amorphous hardware elements similar to that discussed in relation to the Kirchhoff algorithm.

Each of the processing pipelines images a different input trace into the set of output traces. Further, a great degree of parallelism can be achieved in the tri-diagonal matrix solver, so a single solver itself can be branched into many mini-pipelines. These parallel processing pipelines can be implemented in a number of amorphous hardware elements within a single FPGA, or across multiple FPGAs. An exemplary processing pipeline tailored to implementing the finite wave equation may include for each x, y and z: (A) update differencing equations, (B) tri-diagonal solver, (C) thin lense adjustment, and (D) sum the input trace's contribution into an output grid matrix. Each of these stages can include many clock cycles, and the overall processing pipeline can include hundreds of clock cycles.

In stage "A" a function F(Dx,Dy,Dz,Vint,Dt, Data) is set up to create a set of simultaneous equations. In the function, Dx, Dy and Dz are the distances between the grid cells in the respective x,y,z coordinate direction. Vint is the interval velocity model, Dt is again the time sampling of the input trace, and Data is the actual input trace data. Example code can be obtained from Claerbout, Imaging the Earth's Interior, p. 136. The referenced portion of the foregoing publication is included in Appendix A attached hereto. This set of simultaneous equations with boundary conditions form a tri-diagonal matrix.

In stage "B", the tri-diagonal matrix is solved producing a set of values that represents that input trace's contribution to the x,y,z image grid. These values are then filtered based on function F(Vint, Ds, Dr) to avoid aliasing similar to that discussed above in relation to the Kirchhoff algorithm. In stage "C" the thin lense term is applied to account for the lateral velocity gradient using a function, F(V(x,y,z), Dz). Such a function is more fully described on page 137, Claerbout, Imaging the Earth's Interior, p. 137. This adjusted value is then summed into the output grid matrix at stage "D".

In some cases, all processing is completed through programming the amorphous hardware elements a single time as previously described. In other cases, processing is completed in multiple programming stages where, for example, an amorphous hardware element is programmed to perform one function, and subsequently re-programmed to perform another function. Such an approach is described in relation to blocks 650–680 of FIG. 6. The results from one programmed computation can be received by the general purpose computer (block 650). The amorphous hardware elements can then be re-programmed to perform a different computation (block 660), and the results from that computation can also be received (block 670). The results from the various computations can then be assembled to create a final result (block 680).

Based on the disclosure provided herein, one of ordinary skill in the art will appreciate a variety of other methods and/or algorithms to which amorphous computing systems in accordance with the present invention can be applied. For example, some amorphous hardware elements can be programmed to perform one algorithm, while others are programmed to perform a different algorithm in parallel to the first algorithm. The results from the algorithm can then be applied to amorphous hardware elements programmed to implement yet another algorithm.

As will be appreciated by one of ordinary skill in the art, the degree of parallelism achievable is significant when compared to a general purpose microprocessor. While a general purpose processor offers some degree of parallelism through multiple pipe architectures, superscalar architectures, and the like, they are essentially serial devices when compared to the systems of the present invention. In some cases, multiple general purpose microprocessors can be arranged in parallel, however, this involves a great deal of inefficiency as much of the microprocessors goes unused, and memory sharing attributes associated with such parallel systems can be paralyzing.

As one example of the present invention, each input sample is interpolated, filtered, weighted and summed into five hundred thousand output samples. Each step of this process is unique for each output sample. On a general purpose microprocessor, about fifty clock cycles on a two Gigahertz chip are required to get one input sample through the interpolation process. To increase the throughput, about two hundred computers, each including two general purpose microprocessors are assembled to provide about four billion outputs per second.

In contrast, on the amorphous computing systems in accordance with the present invention where each amorphous computing element includes 0.5 Mbytes of memory, approximately five hundred input traces are loaded into the amorphous computing element, and outputs are sent to an eighteen Gigabyte memory communicably coupled to the amorphous computing elements. Each of the amorphous computing elements are programmed with a pipeline specifically tailored to perform interpolation, filter, weighting and summation of input traces into output traces. Using such an approach, each input trace can be formed into an output trace for each clock period of the amorphous computing element.

Thus, for example, for each output sample we start a pipeline on one of the input traces. Where both the input traces and output traces have five hundred samples each, the process proceeds as follows: (A) input trace 1, sums into output trace 1 sample one; (B) input trace 2, sums into output trace 1sample two; (C) input trace 3, sums into output trace 1 sample three ... (D) input trace 400, sums into output trace 1 sample five hundred, (E) input trace 1, sums into output trace 2, sample one ... (F) input trace 400 sums into output trace 400 sample five hundred. During the process, all of the pipelines programmed in the amorphous computing elements move to the next output sample on the next clock until all pipelines have summed all the input traces into their respective samples.

Thus, in this example, there are one thousand computational pipelines programmed in respective amorphous hardware elements within an FPGA. At startup, a few hundred clocks are expended setting the FPGA up for computation, after which one result per clock can be generated. The input traces sit in memory onboard the FPGA, and are summed into many Gbytes of output traces. As the input traces are summed into each output trace, the previous output traces are stored back in main memory, and the next output traces are fetched from main memory onto the amorphous hardware element. A simple double buffering scheme can be implemented to assure that the pipelines are always executing. After all five hundred input traces have been summed into the full eighteen Gbytes of output space, the next set of input traces are fetched, and the process continues.

Using this type of arrangement, one thousand results can be generated per clock on an amorphous hardware element operating at one hundred Megahertz. This results in one hundred billion results per second on a single FPGA. Thus, where ten FPGAs are programmed to operate in parallel, one 1 trillion results per second (or more where faster, larger, or more amorphous hardware elements are used) can be achieved. This is approximately 250 times the performance of a system created using the two hundred PC cluster described in the aforementioned example.

Turning to FIG. 8, processes associated with supporting varied trace lengths in accordance with some embodiments of the present invention are described. In contrast to a general purpose computer that typically uses some form of a "FOR" loop to implement a variable trace length, some embodiments of the present invention use FPGAs with preset trace lengths directly mapped to amorphous hardware elements on the device. Such FPGAs are not flexible enough to accommodate different length traces within the same direct mapping. Thus, if a function is implemented to accommodate one thousand samples, that map will work for only a trace length of one thousand samples. In some embodiments of the present invention, such a one thousand trace function can be extended to operate on trace lengths of one thousand or less by padding the trace with null data or zeroes out to the one thousand trace limit. Thus, for example, where a given trace is nine hundred samples, the samples from nine hundred one to one thousand are filled with null data to make the trace length compatible with the function. This approach does not allow for accommodating functions with a trace length greater than one thousand. Further, such an approach wastes area on an FPGA by implementing processing pipelines that operate on null data. Thus, in some embodiments, multiple functions of varying length are implemented. From this, a best fit function is selected allowing for accommodation of a particular trace length, while minimizing the amount of wasted area on the FPGA.

In one particular embodiment, the functions are VIVA™ based functions that are created and maintained as a reusable library. Each of the functions implement the same algorithm, but are each modified to accommodate a different trace length. Such trace lengths can be 500, 600, 700, 800, 900, 1000, 1100, 1200, etc. It should be recognized that any number of functions can be created depending upon the amount of space to be used in holding the functions, and the willingness to sacrifice space of an FPGA. Thus, in the extreme case, a function can be created to handle each increment in trace length such as, for example, 1000, 1001, 1002, etc. Each of the functions is then identified by a name that indicates the length of the function to be handled such as, for example, Kirchhoff_Length1000. The various functions can then be compiled together, and at run time the general purpose computer responsible for programming the various FPGAs can select the appropriate function based in part on the desired trace length. In this way the direct mapping limitation associated with using amorphous hardware elements can be hidden from the end user by making a separate design for each increment of trace length that is to be supported.

Figure 8A:
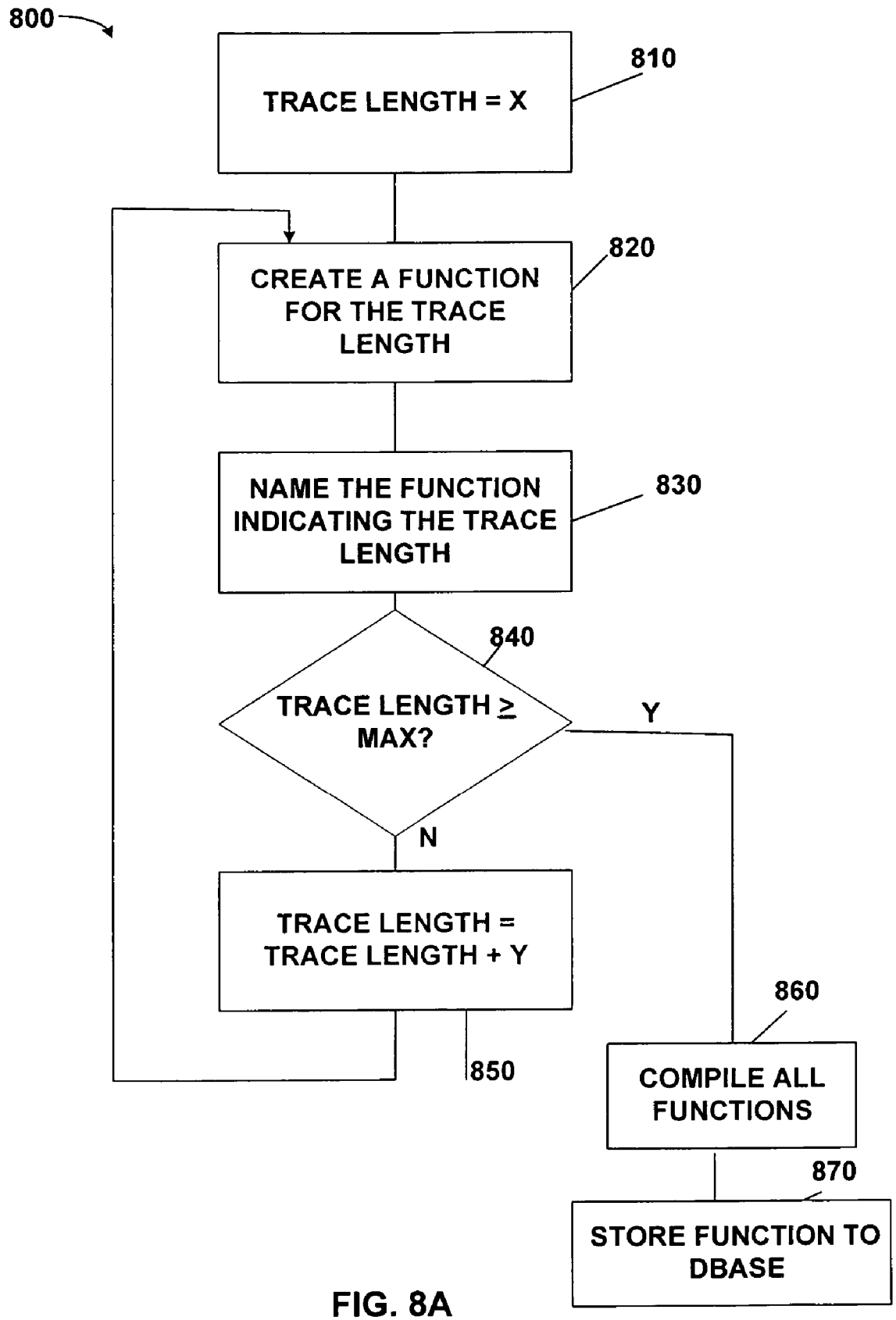
FIG. 8 illustrate methods for supporting various trace lengths in accordance with some embodiments of the present invention.

FIG. 8a includes a flow diagram 800 that illustrates a process in accordance with embodiments of the present invention for producing functions capable of implementation on amorphous hardware elements operable to accommodate traces of differing lengths. Following flow diagram 800, a first trace length x is selected (block 810). This trace length x defines the shortest trace length function to be created. The function is then created for the trace length (block 820) and the function is named to indicate the trace length (block 830). It is then determined if the trace length is equal to or greater than a desired maximum trace length (block 840). If it is determined that the trace length is less than the desired maximum trace length (block 840), the trace length is incremented by a trace step y (block 850) and the processes of blocks 820, 830 and 840 are repeated for the incremented trace length. Alternatively, where the trace length is determined to be greater than or equal to the desired maximum trace length (block 840), all of the functions created to that point are compiled together (block 860), and the executable functions are stored to a database(block 870).

Figure 8B:
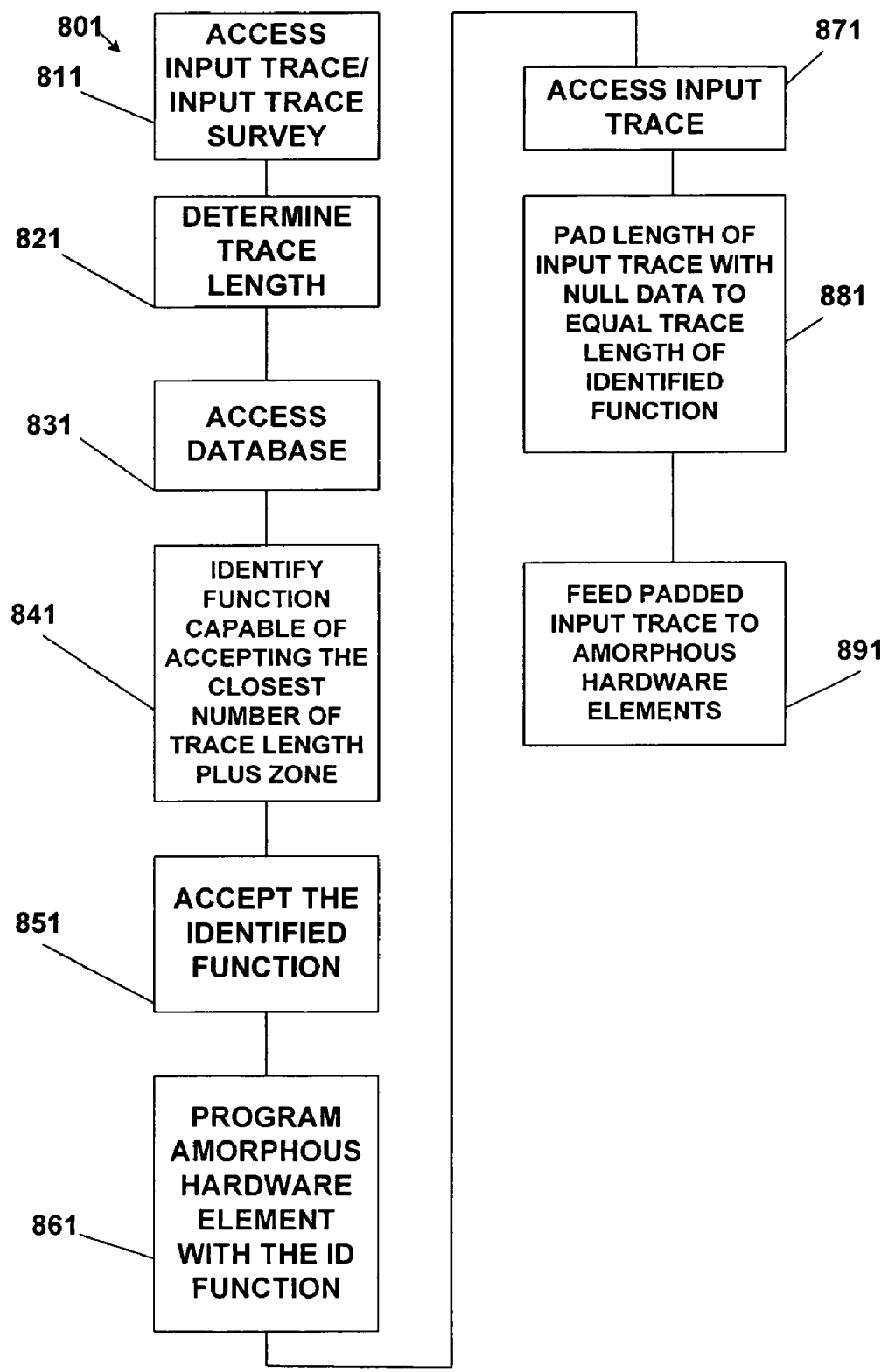

Turning to FIG. 8b, a flow diagram 801 illustrates a process that utilizes the previously described multi-length functions to implement a function algorithm applied to a particular trace length. Following flow diagram 801, an input trace and/or a survey of input traces is accessed (block 811). A length for a given input trace can be determined (block 821), or in the case where all input traces within a given survey are of the same length, a length for all of the traces can be determined. A database including the various multi-length functions is accessed (block 831), and one of the functions that is incrementally larger than the previously determined trace length is identified (block 841). Thus, for example, where the determined trace length is 1021 and the available functions are Function_length900, Function_length1000, Function_length1100 and Function_length1200, the selected function is Function_length1100.

This identified function is accessed (block 851) and one or more amorphous hardware elements are programmed to perform the function (block 861). Input traces are then accessed (block 871), and the input traces are padded with null data such that the input trace length equals the length of the selected function. Thus, in the previous example, seventy-nine zeroes would be added to each input trace. These padded input traces are then fed to the amorphous hardware elements programmed to perform the selected function on the input traces (block 891).

The invention has now been described in detail for purposes of clarity and understanding. However, it will be appreciated that certain changes and modifications may be practiced within the scope of the appended claims. For example, it should be recognized that the present invention can be used in relation to a number of algorithms and/or variations of algorithms. For example, the present invention can be used in relation to the Kirchhoff pre-stack time and the Kirchhoff pre-stack depth, which are both variations on the same basic algorithm. The difference between the aforementioned variations is in the function that calculates the time of the input trace to contribute. In the Kirchhoff prestack-time it is calculated using the exemplary function previously described, and in the Kirchhoff pre-stack depth it uses a set of tables, that can be calculated using a program called a travel time generator (a ray tracer in one particular case). The program produces a disk file of times related to source/receiver combinations. The migration then reads these tables to get the time of the input trace, rather than uses the other portions of the aforementioned function.

Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. An amorphous computing system for computing seismic images, the system comprising:
    a first amorphous hardware element;
    a computer processor communicably coupled to the amorphous hardware element and to a computer readable medium, wherein the computer readable medium includes instructions executable by the computer processor to:
        define a first plurality of hardware gates within the amorphous hardware element to form a first processing pipeline, wherein the first processing pipeline is operable to update a first seismic image point; and
        define a second plurality of hardware gates within the amorphous hardware element to form a second processing pipeline, wherein the second processing pipeline is operable to update a second seismic image point independent of the first processing pipeline.

2. The system of claim 1, wherein the computer readable medium further includes a set of coefficients for a high frequency filter corresponding to a threshold noise frequency and a set of coefficients for a sinc filter.

3. The system of claim 2, wherein the first processing pipeline and the second processing pipeline include functions operable to implement at least some elements of a Kirchhoff algorithm, and wherein the functions include:
    a first function, wherein the first function interpolates a velocity function to calculate a velocity at an image point;
    a second function, wherein the second function utilizes the velocity to calculate a time of a data trace that contributes to the image point;
    a third function, wherein the third function utilizes the time of the data trace to calculate a real sample number of the data trace, and wherein the real sample number of the data trace is a fractional offset from a whole sample number of the data trace;
    a fourth function, wherein the fourth function filters a plurality of whole sample numbers of the data trace that straddle the real sample number of the data trace using the set of coefficients for a high frequency filter;
    a fifth function, wherein the fifth function uses the set of coefficients for a sinc filter to interpolate the filtered plurality of whole number samples to the real sample number; and
    a sixth function, wherein the sixth function sums the output of the fifth function into an output trace at the image point.

4. The system of claim 1, wherein the first processing pipeline and the second processing pipeline include functions operable to implement at least some elements of a wave equation algorithm, and wherein the functions include:
    an update function, wherein the update function creates a set of simultaneous equations that will distribute energy from the data trace to a set of output image points located on an x,y,z coordinate grid;
    a tri-diagonal solver function, wherein the tri-diagonal solver function solves the set of simultaneous functions; and
    a thin lense adjustment function, wherein the thin lense adjustment function compensates for a lateral velocity gradient.

5. The system of claim 1, wherein the amorphous hardware element comprises a first field programmable gate array, and wherein the system further comprises:

a second field programmable gate array communicably coupled to the computer processor, wherein the computer readable medium further includes instructions executable by the computer processor to:
define a third plurality of hardware gates within the second field programmable gate array to form a third processing pipeline, wherein the third processing pipeline is operable to update a third seismic image point independent of the first processing pipeline and the second processing pipeline.

6. The system of claim 1, wherein the amorphous hardware element comprises a field programmable gate array, and wherein the computer processor comprises a reduced instruction set computer processor.

7. A system for implementing a Kirchhoff algorithm, the system comprising:
a field programmable gate array;
a computer processor communicably coupled to the field programmable gate array and to a computer readable medium, wherein the computer readable medium includes a set of coefficients for a high frequency filter corresponding to a threshold noise frequency and a set of coefficients for a sinc filter, and instructions executable by the computer processor to:
define a first plurality of hardware gates within the field programmable gate array to form a first processing pipeline, wherein the first processing pipeline is operable to update a first seismic image point, and wherein the first processing pipeline implements the following functions:
a first function, wherein the first function interpolates a velocity function to calculate a velocity at an image point;
a second function, wherein the second function utilizes the velocity to calculate a time of a data trace that contributes to the image point;
a third function, wherein the third function utilizes the time of the data trace to calculate a real sample number of the data trace, and wherein the real sample number of the data trace is a fractional offset from a whole sample number of the data trace;
a fourth function, wherein the fourth function filters a plurality of whole sample numbers of the data trace that straddle the real sample number of the data trace using the set of coefficients for a high frequency filter;
a fifth function, wherein the fifth function uses the set of coefficients for a sinc filter to interpolate the filtered plurality of whole number samples to the real sample number;
a sixth function, wherein the sixth function sums the output of the fifth function into an output trace at the image point;
define a second plurality of hardware gates within the field programmable gate array to form a second processing pipeline, wherein the second processing pipeline is operable to update a second seismic image point independent of the first processing pipeline, and wherein the second processing pipeline implements the following functions:
the first function, wherein the first function interpolates a velocity function to calculate a velocity at an image point,
the second function, wherein the second function utilizes the velocity to calculate a time of a data trace that contributes to the image point;
the third function, wherein the third function utilizes the time of the data trace to calculate a real sample number of the data trace, and wherein the real sample number of the data trace is a fractional offset from a whole sample number of the data trace;
the fourth function, wherein the fourth function filters a plurality of whole sample numbers of the data trace that straddle the real sample number of the data trace using the set of coefficients for a high frequency filter;
the fifth function, wherein the fifth function uses the set of coefficients for a sinc filter to interpolate the filtered plurality of whole number samples to the real sample number; and
the sixth function, wherein the sixth function sums the output of the fifth function into an output trace at the image point.

8. A method of computing a plurality of seismic output traces from a plurality of seismic input traces, the method comprising:
segregating the input traces into a plurality of sets of input traces;
programming groups of hardware gates within an amorphous hardware element, each group of programmed hardware gates comprising a separate processing pipeline implementing at least a portion of a seismic imaging algorithm; and
operating the amorphous hardware element to process at least a portion of the plurality of sets of input traces through the processing pipelines into at least a portion of the plurality of output traces.

9. The method of claim 8 further comprising:
initializing an output image file in memory associated with the amorphous hardware element, the output image file comprising the plurality of output traces; and
reading the plurality of input traces into memory associated with the amorphous hardware element.

10. The method of claim 9 wherein in said steps of initializing and reading, the output image file is initialized in memory external from the amorphous hardware element and the plurality of input traces are read into memory internal to the amorphous hardware element.

11. The method of claim 8 wherein said step of segregating comprises:
identifying groups of output traces;
associating each group of output traces with a group hardware gates comprising one of the processing pipelines;
assembling input traces relevant to each group of output traces into the sets of input traces; and
assigning each set of input traces to the processing pipeline comprising the group of hardware gates associated with the group of output traces to which each set of input traces is relevant.

12. The method of claim 8, wherein the at least a portion of the seismic imaging algorithm includes elements of a Kirchhoff algorithm.

13. The method of claim 12, wherein the method further comprises:
generating a set of coefficients for a high frequency filter corresponding to a threshold noise frequency and a set of coefficients for a sinc filter.

14. The method of claim 13, wherein in said step of generating, each of the high frequency filter and the sinc filter includes at least twenty points.

15. The method of claim 13, wherein, for each processing pipeline, said step of operating comprises:
  interpolating a velocity function to calculate a velocity at an image point;
  utilizing the velocity to calculate a time of an input trace that contributes to the image point;
  calculating a real sample number of the input trace using the time of the input trace, the real sample number of the input trace comprising a fractional offset from a whole sample number of the input trace;
  filtering a plurality of whole sample numbers of the input trace that straddle the real sample number of the input trace using the set of coefficients for the high frequency filter;
  using the set of coefficients for the sinc filter to interpolate the high frequency filtered plurality of whole number samples to the real sample number; and
  summing the output of the sine filter into an output trace at the image point.

16. The method of claim 8, wherein the at least a portion of the seismic imaging algorithm includes elements of a wave equation algorithm.

17. The method of claim 16, wherein, for each processing pipeline, said step of operating comprises:
  creating a set of simultaneous equations that distribute energy from an input trace to a set of output image points located on an x,y,z coordinate grid, the set of simultaneous equations with boundary conditions comprising a tri-diagonal matrix;
  solving the tri-diagonal matrix to obtain a set of values representing a contribution of the input trace to the set of output image points;
  applying a thin lense adjustment compensating for a lateral velocity gradient to the set of values to obtain an adjusted value; and
  summing the adjusted value into the output trace.

18. The method of claim 8, wherein in said step of programming hardware gates within the amorphous hardware element, a first group of hardware gates within the amorphous hardware element is programmed to form a first processing pipeline, and a second group of hardware gates within the amorphous hardware element is programmed to form a second processing pipeline.

19. The method of claim 18, wherein in said step of operating the amorphous hardware element, the first processing pipeline updates a first seismic image point and the second processing pipeline updates a second seismic image point.

20. The method of claim 19, wherein in said step of operating the amorphous hardware element, the first processing pipeline operates independent of the second processing pipeline.

21. The method of claim 8, wherein the amorphous hardware element comprises a field programmable gate array communicably coupled with a general purpose computer processor.

22. The method of claim 21 wherein the general purpose computer processor comprises a reduced instruction set computer processor.

23. The method of claim 8, wherein in said step of operating the amorphous hardware element, each of the processing pipelines operates to update a seismic image point in parallel with others of the processing pipelines.

24. The method of claim 8, further comprising:
  programming groups of hardware gates within at least one additional amorphous hardware element, each group of hardware gates comprising a separate processing pipeline implementing at least a portion of a seismic imaging algorithm; and
  operating the at least one additional amorphous hardware element to process at least a portion of the sets of input traces into at least a portion of the output traces.

25. The method of claim 24 wherein the amorphous hardware elements comprise field programmable gate arrays communicably coupled with a general purpose computer processor.

26. The method of claim 25 wherein the general purpose computer processor comprises a reduced instruction set computer processor.

* * * * *